(12) United States Patent
D'Oosterlinck

(10) Patent No.: US 11,061,310 B2
(45) Date of Patent: Jul. 13, 2021

(54) PROJECTOR WITH IMPROVED CONTRAST

(71) Applicant: BARCO NV, Kortrijk (BE)

(72) Inventor: Wouter D'Oosterlinck, Eeklo (BE)

(73) Assignee: BARCO NV, Kortrijk (BE)

( * ) Notice: Subject to any disclaimer, the term of this patent is extended or adjusted under 35 U.S.C. 154(b) by 134 days.

(21) Appl. No.: 16/306,700

(22) PCT Filed: Jun. 2, 2017

(86) PCT No.: PCT/EP2017/063493
§ 371 (c)(1),
(2) Date: Dec. 3, 2018

(87) PCT Pub. No.: WO2017/207771
PCT Pub. Date: Dec. 7, 2017

(65) Prior Publication Data
US 2019/0129291 A1 May 2, 2019

(30) Foreign Application Priority Data

Jun. 3, 2016 (GB) ...................................... 1609787
Nov. 24, 2016 (GB) ...................................... 1619936

(51) Int. Cl.
G03B 21/20 (2006.01)
H04N 9/31 (2006.01)

(52) U.S. Cl.
CPC ....... *G03B 21/2013* (2013.01); *G03B 21/206* (2013.01); *G03B 21/2033* (2013.01); *G03B 21/2053* (2013.01); *H04N 9/3164* (2013.01)

(58) Field of Classification Search
CPC ............ G03B 21/2013; G03B 21/2033; H04N 9/3161; H04N 9/3164
See application file for complete search history.

(56) References Cited

U.S. PATENT DOCUMENTS

| 7,431,464 B2 * | 10/2008 | Park .................. G02B 26/0808 353/97 |
| 7,832,869 B2 | 11/2010 | Maximus et al. |
| 2005/0052621 A1 | 3/2005 | Allen et al. |
| 2011/0157245 A1 | 6/2011 | Young |
| 2012/0188469 A1 | 7/2012 | Fukui |
| 2014/0028985 A1 | 1/2014 | Janssens |
| 2016/0139419 A1 | 5/2016 | Huang |
| 2018/0246325 A1 * | 8/2018 | Frisken ................ H04N 9/3126 |

OTHER PUBLICATIONS

International Preliminary Report on Patentability in related PCT Application No. PCT/EP2017/063493, dated Dec. 4, 2018.

(Continued)

*Primary Examiner* — Ryan D Howard
(74) *Attorney, Agent, or Firm* — Hamre, Schumann, Mueller & Larson, P.C.

(57) ABSTRACT

A projector, including a light modulation module including at least one light modulator illuminated by light of at least two primary colours, light of each primary colour having at least two wavelengths or wavelength ranges, where the optical power emitted at a wavelength or wavelength range associated with a lower contrast of a projected image is lower than the optical power emitted at a wavelength associated with a higher contrast of the projected image.

21 Claims, 9 Drawing Sheets

(56) References Cited

OTHER PUBLICATIONS

International Search Report for PCT/EP2017/063493, dated Aug. 8, 2017.
Written Opinion for PCT/EP2017/063493, dated Aug. 8, 2017.
GB Search Report in related GB Application No. 1609787.5, dated Nov. 18, 2016.
GB Search Report in related GB Application No. 1619936.6, dated Feb. 27, 2017.
Digital Cinema Initiatives, LLC, Digital Cinema System Specification, Version 1.1, Apr. 12, 2007.

* cited by examiner

Fig. 1
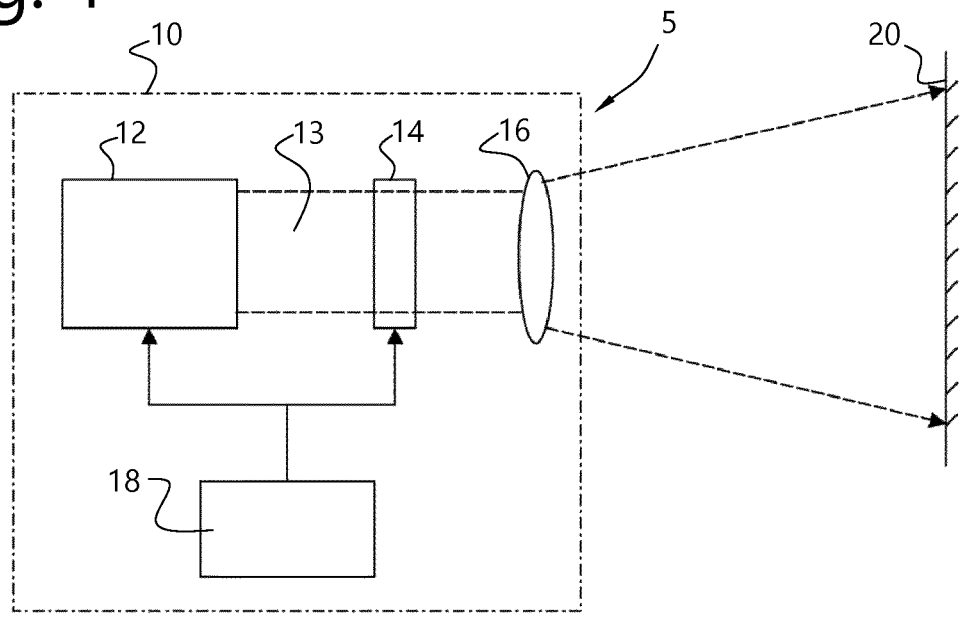
Fig. 2A
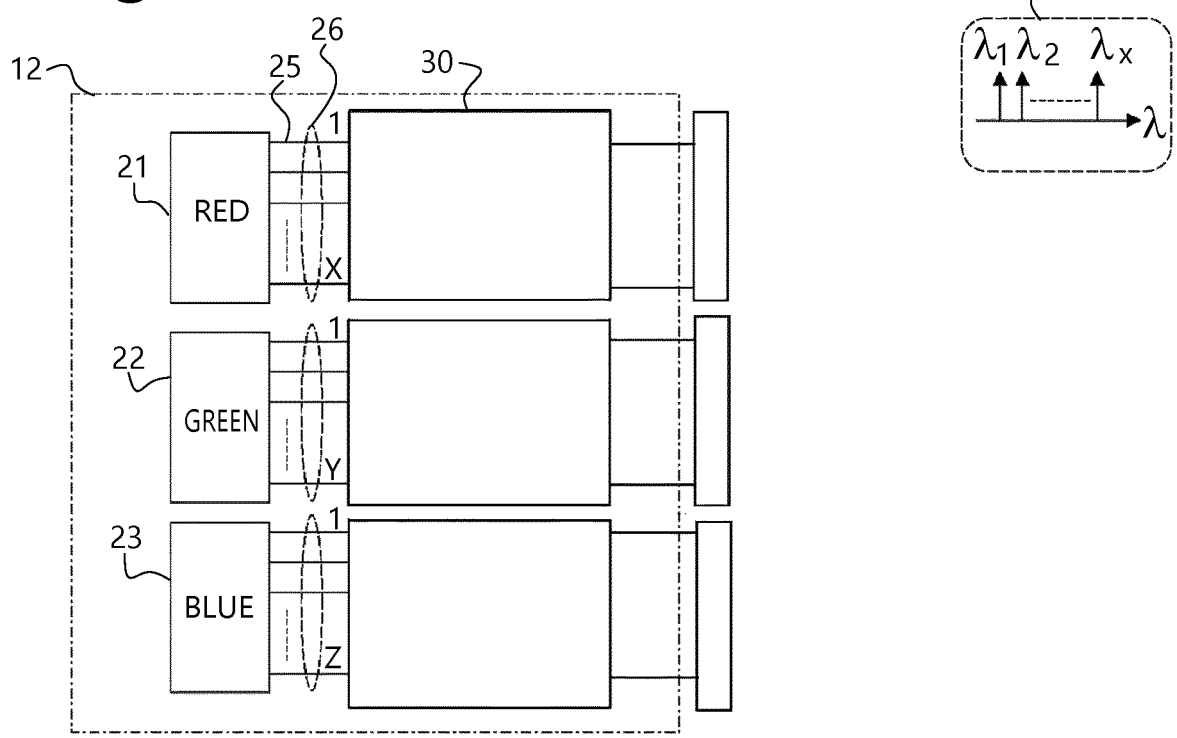
Fig. 2B

PROJECTOR WITH IMPROVED CONTRAST

This invention relates to a projector which uses a light source, an integrator and a light modulator and methods to increase contrast of images projected by such a projector as well as to a method of using such a projector, a controller for such a projector and a method of operating such a projector.

BACKGROUND OF THE INVENTION

Projection systems require a high-quality light source. While projection systems have traditionally used discharge lamps as a light source, there is now interest in alternative light sources such as lasers. Lasers have the advantage that they emit a high intensity light beam so that they have the potential to project high contrast images.

The importance of contrast ratio lies, in one aspect, in the tendency of humans to compare everything shown in images. A high contrast ratio helps a viewer to distinguish objects from each other. Contrast helps to guide attention of viewers of projected images. It is therefore desirable to project images with acceptable image quality such as a high contrast.

A projector is known with light sources which direct light beams, e.g. through a lens to an integrator. The light sources can emit different wavelengths for the same primary colour. Different primary colours can be combined using dichroic mirrors.

A plurality of wavelengths $\lambda 1, \lambda 2, \lambda 3, \lambda 4 \ldots$ can be output by a light source. The different wavelengths $\lambda 1, \lambda 2, \lambda 3, \lambda 4 \ldots$ can be delivered from different laser packages. For example, each package can include an array of emitters, but these emitters deliver laser light at the same wavelength. Beam combination optics such as a lens brings the bundles of light together as closely as possible.

The lasers can be provided in an array. The lasers in the array can be of the same wavelength or different wavelengths. A compromise has to be made, for example, to be able to reduce de-speckling while maximizing optical efficiency, ideally without increasing the length of the optical path.

For example, an array of 4 wavelengths for a light source producing a single primary colour can be arranged. The aim is that each wavelength has an equal number of sources and that their energy is well distributed across the angular space of the light source. The distribution of light sources of the different primaries is not necessarily regular. All of the sources have the same polarization or the polarizations can be mixed. In both cases the mixing is irregular, and does not follow a regular pattern. The teaching therefore to reduce speckle is to randomise the distribution of different light sources in an array even if the array is regular.

SUMMARY OF THE INVENTION

In an aspect the present invention a projector is provided, comprising a light modulation module, comprising at least one light modulator, illuminated by light of at least one, two or more primary colours, light of one, some or each primary colour having at least two wavelengths or wavelength ranges,
wherein the optical power emitted at a wavelength or wavelength range or an f number for a wavelength or wavelength range is set to increase contrast of a projected image.

In an aspect the present invention a controller is provided for a projector having a light modulation module comprising at least one light modulator illuminated by light of light sources emitting light of at least one, two or more primary colours, light of one, some or each primary colour having at least two wavelengths or wavelength ranges,
wherein the controller is adapted to control optical power emitted at a wavelength or wavelength range or an f number for a wavelength or wavelength range to increase contrast of a projected image.

In an aspect the present invention a method is provided of operating a projector having a modulation module comprising at least one light modulator, the method comprising: illuminating with light of at least one, two or more primary colours, light of one, some or each primary colour having at least two wavelengths or wavelength ranges, controlling optical power emitted at a wavelength or wavelength range or an f number for a wavelength or wavelength range to increase contrast of a projected image.

In an aspect the present invention a computer program product is provided comprising software, which when executed on a processing engine, executes any of the methods of the present invention. A non-transient signal storage means can be provided for storing the computer program product.

In an aspect the present invention provides a projector, comprising a light modulation module comprising at least one light modulator illuminated by light of at least one, two or more primary colours, light of one, two or each of the at least one, two or more primary colours having at least two wavelengths or wavelength ranges, wherein the optical power emitted at a wavelength or wavelength range associated with a lower contrast in a projected image is lower than the optical power emitted at a wavelength associated with a higher contrast in the projected image or in another projected image.

The light modulation module of this aspect may have at least one light modulator illuminated by light of at least three primary colours, light of one, two, three or each of the at least three primary colours having at least two wavelengths or wavelength ranges.

Preferably, which primary colour or colours is/are selected to have two wavelengths or wavelength ranges is in this order of preference, first green, then red and finally blue. This has the advantage that the projected images are adapted for the photopic luminosity function of the human eye. Rarely the images may be adapted for the scotopic luminosity function. This function describes the average spectral sensitivity of human visual perception of brightness in bright (photopic) or dark (scotopic) conditions respectively. Photopic luminosity of the eye shows a peak of sensitivity around 550, e.g. which lies in the range which corresponds to the green colour. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, and more preferably 600-670 nm and even more preferably 625-650 nm, are most preferably selected. Blue wavelengths can lie in the range 425 to 500 nm. Any wavelength selected in the range of 570-600 nm will be yellow, and in the range 600-625 nm will be orange, thus it will not correspond to a pure primary colour but a selection in this range is not excluded from the present invention. Any wavelength selected above 650 nm has a reduced photopic luminosity function, therefore the contrast will also be reduced by choosing a wavelength above 650 nm, and even more above 670 nm.

In any some or all embodiments according to the present invention, the light modulation module comprises at least one light modulator illuminated by light having two wavelengths or two wavelength ranges of at least one primary colour, which is preferably green, two primary colours, which are preferably green and red, or more primary colours, which preferably comprise red, green and blue. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

In another aspect the present invention provides a projector, comprising a light modulation module comprising at least one light modulator illuminated by light of at least one, two or more primary colours, light of one, two or of each of the at least one, two or more primary colours having at least two wavelengths or wavelength ranges, wherein the optical power emitted at a wavelength associated with a lower contrast in a projected image is lowered when a contrast ratio of an image being projected is to be increased.

The light modulation module of this another aspect may have at least one light modulator illuminated by light of at least three primary colours, light of one two or more of the at least three primary colours having at least two wavelengths or wavelength ranges. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm and even more preferably 625-650 nm, are most preferably selected. Blue wavelengths can lie in the range 425 to 500 nm.

In a further aspect the present invention provides a projector, and a light modulation module comprising at least one light modulator illuminated by light of at least one, two or more primary colours, light of one, two or of each of the at least one, two or more primary colours having at least two wavelengths or wavelength ranges, wherein an f number for the optical path of the projector for a wavelength associated with a lower contrast of a projected image is higher than an f number for a wavelength associated with a higher contrast of a projected image.

The light modulation module of this further aspect may have at least one light modulator illuminated by light of at least three primary colours, light of one, two or three of the at least three primary colours having at least two wavelengths or wavelength ranges. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm The initial setup of the light sources such as wavelength selection and/or spatial distribution of the light sources and/or for the projector will provide static or ANSI contrast. An increase in sequential contrast (e.g. full ON/full OFF contrast ratio) typically also leads to an increase in static, i.e. ANSI contrast.

Light having a primary colour can be generated by a coherent light source such as a laser.

Lights of at least two primary colours can be generated by at least two coherent light sources such as lasers.

Lights of at least three primary colours can be generated by at least three coherent light sources such as lasers.

Light sources for the primary colours can be arranged in a 2D array, wherein at least one light source or at least two light sources for a primary colour is a primary colour generating a lower contrast ratio in a projected image, the at least one light source or at least two light sources being placed at the periphery of the array.

Light sources for the at least two primary colours can be arranged in a 2D array, wherein at least one light source or at least two light sources for a primary colour is a primary colour generating a higher contrast ratio, the at least one light source or at least two light sources being placed towards or at the centre of the array.

Some or all of the primary colours have spectra generated by light sources such as lasers or light sources formed by wavelength filtering in an illumination path from broadband sources, and wherein the primary colours in combination minimally provide a target (e.g. DCI, REC709, ...) gamut.

In one, more or all embodiments of the present invention one or more light sources can be one or more narrowband light sources. The contribution of the narrowband sources in the primary colours can be adapted in such a way that a contrast ratio improvement is realized for projected images.

In one, more or all embodiments of the present invention light sources are provided for different wavelengths or wavelength ranges. Each wavelength or wavelength range of the primary colours can be controlled, e.g. selected, independently of one another to dynamically change the sequential contrast and/or brightness of projected images based on the frame or scene content.

In one more or all embodiments of the present invention a distribution of wavelengths in an illumination aperture can be such that a higher contrast ratio is obtained.

In one more or all embodiments of the present invention diffraction can be used to increase contrast of projected images.

In one more or all embodiments of the present invention a dimension of a pixel or of a pixel pitch of the at least one light modulator can be selected to increase contrast.

In one more or all embodiments of the present invention the light modulator can have mirrors that tilt, and the tilt angles of the different mirror imagers are selected such that higher contrast is obtained. Selecting an illumination angle of light onto the light modulator has a similar effect as setting the tilt angle change.

In another aspect the present invention provides a controller for a projector having a light modulator illuminated by light of light sources emitting light at least one, two or three primary colours, light of one, two or each of the at least one, two or three primary colours having at least two wavelengths or wavelength ranges, wherein the controller is adapted to control a first optical power emitted by the light sources at a wavelength or wavelength range associated with a lower contrast of a projected image such that the first optical power is lower than a second optical power emitted at a wavelength associated with a higher contrast of the projected image.

The light modulation module of this another aspect may have at least one light modulator illuminated by light of at least one, two or three primary colours, light of the one, two or three of the at least three primary colours having at least two wavelengths or wavelength ranges. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

The light modulation module of this another aspect may have at least one light modulator illuminated by light of at least three primary colours, light of each of the at least three primary colours having at least two wavelengths or wavelength ranges.

In yet another aspect the present invention provides a controller for a projector having a light modulator illuminated by light of light sources emitting light at least one, two or more primary colours, light of one, some or each of the at least one, two or more primary colours having at least two wavelengths or wavelength ranges, wherein the controller is adapted to reduce a first optical power of light emitted from the projector at a wavelength associated with a lower contrast of a projected image when a contrast ratio of an image being projected is to be increased.

The light modulation module of yet another aspect may have at least one light modulator illuminated by light of at least three primary colours, light of one or two or each of the at least three primary colours having at least two wavelengths or wavelength ranges. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

The light modulation module of this yet another aspect may have at least one light modulator illuminated by light of at least three primary colours, light of each of the at least three primary colours having at least two wavelengths or wavelength ranges.

In still another aspect the present invention provides a controller for a projector having a light modulator illuminated by light of light sources emitting light at least one, two or more primary colours, light of each of the at least one, two or more primary colours having at least two wavelengths or wavelength ranges, wherein the controller is adapted to increase an f number for a wavelength associated with a lower contrast of a projected image compared with an f number for a wavelength associated with a higher contrast.

The light modulation module of still another aspect may have at least one light modulator illuminated by light of at least three primary colours, light of one, or two of the at least three primary colours having at least two wavelengths or wavelength ranges. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

The light modulation module of this still another aspect may have at least one light modulator illuminated by light of at least three primary colours, light of each of the at least three primary colours having at least two wavelengths or wavelength ranges.

Further embodiments of the controller are defined in the dependent claims.

In an aspect the present invention provides a method of operating a projector having a light modulator, the method comprising:

illuminating the light modulator by light of at least one, two or more primary colours, light of one, some or each of the at least one, two or more primary colours having at least two wavelengths or wavelength ranges, emitting light at a wavelength or wavelength range associated with a lower contrast ratio of a projected image with a first optical power that is lower than a second optical power emitted at a wavelength associated with a higher contrast of the projected image.

The method of this aspect may illuminate light of at least three primary colours, light of one or two of the at least three primary colours having at least two wavelengths or wavelength ranges. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

The method of this aspect may illuminate light have at least three primary colours, light of each of the at least three primary colours having at least two wavelengths or wavelength ranges.

In a further aspect the present invention provides a method of operating a projector having a light modulator, the method comprising:

Illuminating the light modulator with light of at least one or two or more primary colours, light of one, or some or each of the at least one or two or more primary colours having at least two wavelengths or wavelength ranges, Emitting light at a wavelength associated with a lower contrast of a projected image with a lower optical power when a contrast ratio of an image being projected is to be increased.

The method of this further aspect may illuminate light of at least three primary colours, light of one or two of the at least three primary colours having at least two wavelengths or wavelength ranges. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

The method of this further aspect may illuminate light have at least three primary colours, light of each of the at least three primary colours having at least two wavelengths or wavelength ranges.

In another aspect the present invention provides a method of operating a projector having a light modulator, the method comprising illuminating the light modulator with light of at least one, two or more primary colours, light of one, some or each of the at least one, two or more primary colours having at least two wavelengths or wavelength ranges, an f number for a wavelength associated with a lower contrast of a projected image being higher than the f number for a wavelength associated with a higher contrast.

The method of this another aspect may illuminate light of at least three primary colours, light of one, two or three of the at least three primary colours having at least two wavelengths or wavelength ranges. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

The method of this another aspect may illuminate light have at least three primary colours, light of each of the at least three primary colours having at least two wavelengths or wavelength ranges.

In an aspect the present invention provides a method to dynamically adapt contrast in images projected by a projector having a 2D configuration of the various laser sources, the various laser sources being pre-calibrated as a function of power and measured contrast of images projected with the sources, the method comprising the steps of:
selecting laser sources from the 2D configuration of the various laser sources, such that they provide one or two or more primary colours, light of one, or some or each of the at least one, two or more primary colours having at least two wavelengths or wavelength ranges;
and
the optical power emitted at a wavelength associated with a lower contrast of a projected image is lowered when a contrast ratio of an image being projected is to be increased, or
the optical power emitted at a wavelength associated with a lower contrast of a projected image is lowered or increased when a contrast ratio of an image being projected is to be increased or lowered dependent upon the image content. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

In another aspect the present invention provides a method to dynamically adapt contrast in images projected by a projector having a 2D configuration of the various laser sources, the various laser sources being pre-calibrated as a function of power and measured contrast of images projected with the sources, the method comprising the steps of:
selecting laser sources from the 2D configuration of the various laser sources, such that they provide one, two or more primary colours, light of one, some or each of the at least one, two or more primary colours having at least two wavelengths or wavelength ranges; and
wherein at least one light source or at least two light sources for a primary colour is a primary colour generating a higher contrast ratio, the at least one light source or at least two light sources being selected that is/are towards or at the centre of the 2D array, or at least one light source or at least two light sources for a primary colour is a primary colour generating a higher contrast ratio, the at least one light source or at least two light sources being selected that is/are towards or at the centre of the 2D array dependent upon the image content. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

Another aspect of the present invention provides a method of operating a projector which further comprises the steps of:
selecting laser sources, such that they provide one, two or more primary colours, light of one, some or each primary colour having at least two wavelengths or wavelength ranges
determining a 2D configuration of the various laser sources according to their wavelengths and according to the higher or lower contrast which is associated to each wavelength, and further according to if the contrast is to be increased or balanced across the projected images,
pre-calibrating the various lasers of the configuration as a function of power and measured contrast, the method further comprises the step of, for each projected image,
measuring the brightness of the projected images, wherein the brightness can be calculated with a brightness detector or can be provided as an input to the laser drivers,
the method further comprises the step of calculating the power for each laser source as a function of the measured brightness and pre-calibration values,
driving each laser source with the calculated optical power.

Further embodiments of the method are defined in the dependent claims.

In an aspect the present invention provides a computer program product comprising software, which when executed on a processing engine, executes any of the methods of the present invention.

A non-transient signal storage means can store the computer program product.

In an aspect the present invention provides a system wherein a spectrum of an illumination comprises at least one, two or three primary colours,
said primary colours spectra are generated by narrow band light sources such as lasers or by wavelength filtering in an illumination path from broadband sources,
the primary colours in combination provide a target (e.g. DCI, REC709, . . . ) gamut,
the contribution of the said narrowband sources in the said primary colours is adapted in such a way that a contrast ratio improvement is being realized for the projection system,
each wavelength of the primary colours being controlled independently of one another to dynamically change the contrast and/or brightness of projected images of the projection system based on a video frame or image content.

BRIEF DESCRIPTION OF THE FIGURES

Embodiments of the invention will be described, by way of example only, with reference to the accompanying schematic drawings in which:

FIG. 1 illustrates a projector according to an embodiment of the present invention FIG. 2A shows a projector comprising a combination of an array of light source modules of the same primary colour with a number of different wavelengths, an integrator and a light modulator according to an embodiment of the invention.

FIG. 2B is a schematic view of the different wavelengths generating each primary colour according to an embodiment of the present invention.

DEFINITIONS

Contrast Ratio

Figure 3:
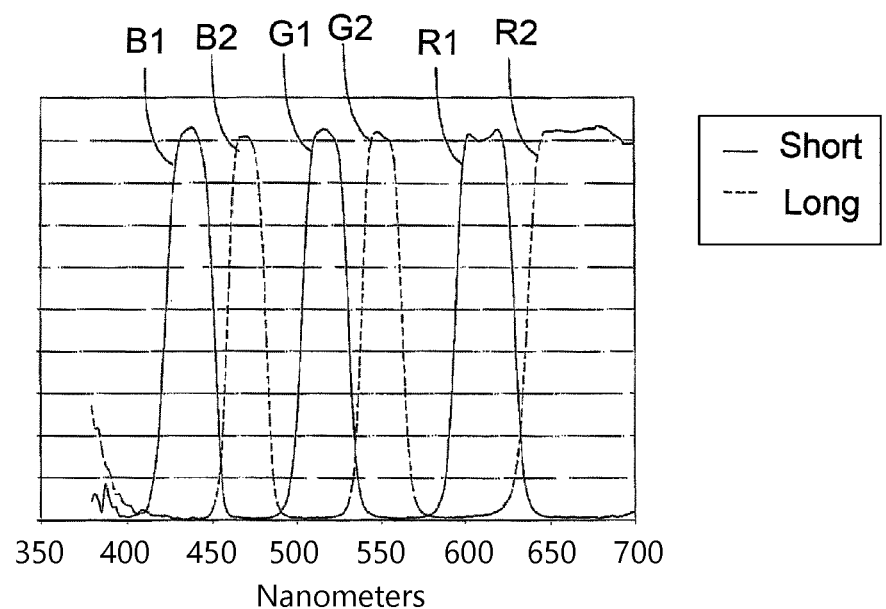
FIG. 3 shows wavelength ranges as used with embodiments of the present invention.

The contrast ratio is a property of a display system, defined as the ratio of the luminance of the brightest color (white) to that of the darkest color (black) that the system is capable of producing. A high contrast ratio is a desired aspect of any display. There is no official, standardized way to measure contrast ratio for a system or its parts, nor is there a standard for defining "Contrast Ratio" that is accepted by any standards organization so ratings provided by different manufacturers of display devices are not necessarily comparable to each other due to differences in method of measurement, operation, and unstated variables. Manufacturers have traditionally favored measurement methods that isolate the device from the system, whereas other designers have more often taken the effect of the room into account. An ideal room would absorb all the light reflecting from a projection screen or emitted by a projector, and the only light seen in the room would come from the display device. With such a room, the contrast ratio of the image would be the same as the contrast ratio of the device. Real rooms reflect some of the light back to the displayed image, lowering the apparent contrast ratio seen in the image.

There are nevertheless two well-known methods to measure the contrast of a display system.

The first method is used to determine the ANSI Contrast (which is based on static images). The ANSI contrast measurement uses a checkerboard pattern of 16 rectangles, eight white and eight black. The brightness values of all the white squares are measured and averaged and the brightness of the black squares are measured and averaged. The ratio of the averaged white readings to the black readings is the ANSI contrast ratio.

The second method is the sequential contrast also known as full ON/full OFF contrast ratio (which is a dynamic contrast ratio). For the Full On/Off contrast ratio one measures (1) the brightness of a white, 100 IRE test pattern ("full on"), and (2) the amount of brightness on a black, 0 IRE test pattern ("full off"), and expresses the two measurements as a ratio of white to black. A contrast ratio of e.g. 1,000:1 indicates that the meter is reading the white in the Full ON period as being one thousand times brighter than the black in the Full Off period.

With respect to the present invention and its embodiments, both ANSI and Sequential contrasts are improved by the apparatuses and methods described. Contrast measured by other methods is also improved.

Sequential Contrast

Sequential Contrast is defined for example in 8.3.4.7 Digital Cinema System Specification Version 1.1 Apr. 12, 2007. The sequential contrast ratio is computed by dividing the white luminance (of a peak white field) by the black luminance (of a black field). The nominal (reference) value is required to have a minimum sequential contrast of 2000:1. The tolerances for mastering and exhibition are shown in Table 11 of 8.3.4.7. In order to eliminate unwanted detail or discoloration in near blacks, it is critical that Mastering Projectors have an equal or higher sequential contrast than all exhibition projectors. Note that this is a measurement of the sequential contrast of the system. It includes the projector and the ambient light on the screen.

Intra-Frame (Checkerboard) Contrast

Intra-frame (Checkerboard) Contrast is defined for example in 8.3.4.8 Digital Cinema System Specification Version 1.1 Apr. 12, 2007 With the spot meter placed at the reference viewing position, measure the luminance levels of each of the patches in the checkerboard test pattern. Intra-frame contrast is computed by summing the luminance of the white patches and dividing by the sum of the luminance of the black patches. Infra-frame contrast is reduced by many factors including projection lens flare, port glass flare, ambient light spilling on the screen and back-reflections from the room itself. Note that this measurement is made with the projector in situ, with the screening room or theater in full operating mode.

Despeckling or De-speckling

A speckle pattern is an intensity pattern produced by mutual interference of a set of wave fronts. Speckle patterns typically occur in diffuse reflections of monochromatic or highly correlated light such as laser light which can occur when a projector system projects and image onto a screen. De-speckling or reduction of speckle can be achieved by different methods. A method disclosed in e.g. US patent application US 20140028985 A1 "Laser projector with reduced speckle" is of particular interest to some aspects of the present invention. Speckle can amongst others be reduced by means of wavelength diversity, i.e. the use of several wavelengths per primary color and/or angular diversity.

f-number

The f-number N or f/# is given by:

$$N = \frac{f}{D}$$

where f is the focal length, and D is the diameter of the entrance pupil (effective aperture). It is customary to write f-numbers preceded by f/, which forms a mathematical expression of the entrance pupil diameter in terms of f and N. For example, if a lens's focal length is 10 mm and its entrance pupil diameter is 5 mm, the f-number is 2, expressed by writing "f/2", and the aperture diameter is equal to "f/2", where f is the focal length.

SMPTE or Society of Motion Picture & Television Engineers defines standard for motion imaging.

Primary colors are sets of colors that can be combined to make a useful range of colors. For human applications, three primary colors are typically used, since human color vision is usually trichromatic, but more colors can be used.

For additive combination of colors in overlapping projected lights, the primary colors normally used are a red, a green, and a blue.

In an additive system, choices of sets of primary colors are nearly arbitrary, subject to weak constraints from the spectral sensitivities of each of the human cone photoreceptors, for example orange, green, and violet primaries have been used. The color gamut obtained will be defined by the color triangle defined by the choice of primaries.

Less than three primary colors can also be used. The choice of only one primary color or two primary colors is preferably adapted to the photopic luminosity function of the eye. When selecting the at least one primary colour, it is important to take into account the photopic luminosity function of the eye which describes the average spectral sensitivity human visual perception of brightness in day light. The peak of the photopic luminosity function is located at around 550-570 nm, which corresponds to the green primary colour. Thus, in preferred embodiments, the primary colour green is preferably selected if a single primary colour is to be used with two wavelengths. In other preferred embodiments, if two primary colours are to be used with two wavelengths or wavelength ranges, the green and red primary colours shall be used as the luminosity function for red colors shows an average spectral sensitivity value of about 0.5-0.6. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

The embodiment comprises the use of at least three primary colours, the selected primary colours will preferably comprise green, red and blue. Note that for the blue color, the luminosity function shows a spectral sensitivity of less than 0.1.

Note that when projecting scenes with low luminosities, i.e. night scenes, it may be useful to use the scotopic luminosity function to select the primary colors, in which case the maximum of the curve is shifted towards shorter wavelengths, i.e. towards 500 nm.

Detailed Description of the Invention

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Polarization

It is believed that polarization does not have an effect on the scope of protection of the present invention. Both polarised light of any type and unpolarised light or any mixture of polarised light types are included within the scope of the present invention and can be used if these light forms are also compatible with other components of the optical system. Polarization generally has an effect on speckle.

EMBODIMENTS

FIG. 1 schematically shows a projection system 5 with which embodiments of the present invention can be used, comprising a projector 10 and a display surface 20 on which an image (still and/or moving) is formed. The display surface 20 can be a display screen or some other surface such as a wall or a face of a building or a sheet of water. The projector 10 can be any suitable projector. For example it can comprise one or more light source apparatus 12, one or more spatial light modulators 14 such as a light valve, a Digital Micro-Mirror Device (DMD), or an LCD (transmissive light valve) or LCOS (reflective light valve) and a projection lens assembly 16. The light source apparatus 12 generates a beam 13 of light to illuminate the light modulator 14. The light modulator 14 can be a spatial light modulator or light valve, e.g. it can comprise a two-dimensional array of light modulating elements, also called light valve elements, e.g. an LCD. Each light modulator or light valve element can correspond to a pixel of the image to be displayed and can be individually controlled to allow an amount of light to pass through/be reflected from that element. In such a spatial light modulator, each light modulator or light valve element can correspond to more than one pixel of the image to be displayed. For example the light modulator can be controlled e.g. by control of oscillating rotation or tilting of micro-mirrors in accordance with a duty cycle or a pulse width modulation to allow an amount of light to pass through/be reflected from a pixel element mirror towards a first and a second direction, i.e. a direction towards a projection lens and a direction towards a light sink. The light modulator can be controlled to project a pixel in a fraction such as one half of an image and in another fraction or in the other half at different times. Typically, each light modulator element e.g. light valve element is controlled across a range of intensity values (e.g. 256) between 'on' and 'off' to provide a range of greyscale values. Such control can include Pulse Width Modulation. The light modulator 14 can use a transmissive technology, such as a liquid crystal panel, in which individual elements are switched on, off or take a value lying between on and off, depending on the amount of light that is required to be transmitted at that pixel location. The different values can be quantized levels. Alternatively, the light modulator 14 can use a reflective technology such as a digital micro-mirror device (DMD) in Digital Light Processing (DLP) or Liquid Crystal On Silicon (LCOS).

Advantageously, in some embodiments, the light beam 13 has an even intensity distribution across the surface of the light modulator 14. Alternatively, e.g. advantageously, in some, e.g. other embodiments, the light beam 13 projects a pattern with an intensity distribution across the surface of the light modulator 14. This pattern can be changed dynamically. The pattern may be created as a caustic pattern which is an envelope of light rays reflected or refracted and projected onto another surface, i.e. onto the surface of the light modulator 14. Such a pattern can provide highlighting for example. Embodiments of the present invention can be used with a variety of light sources but it is particularly useful to use coherent light beams such as those obtained from lasers. When a broadband light source is used, the source can be filtered spectrally whereby only a selected part of the spectrum is used although this may cause a loss of useful light. In embodiments of this invention optionally coherent light is used, and the light source 12 comprises at least one coherent light source, such as a laser light source capable of emitting high-intensity beams of one or more primary colours or a set of laser light sources which are capable of emitting high-intensity beams of one or more primary colours. Certain light sources 12 and their arrangement in arrays will be described in detail below.

The projector also comprises a controller 18 which controls operation of the light source 12 and/or light modulator 14. The controller may be supplied as a separate component.

The projector 10 can comprise three or more light sources and light modulators such as light valves arranged in parallel—one set for each of the primary colours (e.g. red, green, blue or more), or the same set of light modulators such as light valves can be used to sequentially emit each of the primary colours, i.e. red, then green, then blue or more. To obtain special effects or to provide extended color gamut, more primary colors can be used. The number of primary colors may be three, four, five or more, for example.

One, some or all of the embodiments of the present invention may be implemented as multi-chip and single chip implementations. In a multi-chip implementation, parts can be common and parts can be per primary colour.

One, some or all of the embodiments of the present invention may comprise:
   Three or more laser light sources (e.g. one per primary colour, or only one for one primary colour or one for each of two primary colours or one for three or more primary colours), one integrator, one modulator and the primary colours are projected in time sequence (3.1.1),
   Three or more laser light sources (e.g. one per primary colour, or only one for one primary colour or one for each of two primary colours or one for each of three or more colours), three or more integrators (e.g. one per primary), one modulator and the primary colours are projected in time sequence (3.3.1),
   Three or more laser light sources (e.g. one per primary colour, or only one for one primary colour or one for each of two primary colours, or one for each of three or more primary colours), three or more integrators (one per primary colour), and three or more modulators (one per primary colour), whereby the primary colours are projected simultaneously (3.3.3),
   Three or more laser light sources (e.g. one per primary colour, or only one for one primary colour, or one for each of two primary colours or one for each of three or more primary colours), one integrator, three or more modulators (3.1.3), the primary colours are projected simultaneously.

A light modulation module is hereby defined as a module comprising at least one light modulator.

In all embodiments according to the present invention, the light modulation module comprises at least one light modulator illuminated by light of at least one primary colour, which is preferably green, two primary colors, which are preferably green and red, or more primary colours, which preferably comprise red, green and blue. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

For example, in a preferred embodiment of the present invention; an architecture with three chips is provided, where each of the chips is a spatial light modulator and is illuminated by a single primary color. The three single-color images obtained are then merged into one three-color image projected on screen.

FIG. 2A schematically shows a light source apparatus 12 for use with embodiments of the present invention whereby one integrator 30 is provided per colour. The light source apparatus 12 provides three or more primary colours, e.g. from light sources 21, 22, 23 . . . for different primaries such as red green and blue. In one, some or each embodiment of the present invention, there are a plurality of laser light wavelengths for one, some or each primary colour. The light apparatus 12 can also include one or more lenses such as a combination lens 28 located between the light sources 21, 22, 23 . . . producing a light beam 25 and an integrator 30 per primary colour.

For one, some or each primary colour, the wavelengths bands for a primary colour are offset in wavelength from one another. Although each wavelength is shown as a single vertical line in inset 36 of FIG. 2B, it will, in reality, have a certain spectral distribution around the central wavelength as in the example of FIG. 3. In at least some embodiments, there are two wavelengths separated by e.g. 25 to 75 nm or 10 to 15 nm for the so called 6P (6 laser lights emitting different wavelengths) or even less, e.g. 0.5 to 2 nm between two wavelengths for the same primary. Hence the potential range for the difference between two wavelengths is 0.5 to 75 nm.

In the remainder of the description, these wavelengths will be designated by short and long as also indicated in FIG. 3. For instance, for the red primary color, the red light R1 (or red lights) with the shortest wavelength will be named red short and the red light R2 (or red lights) with the longest wavelength will be named red long. The same applies for G1, G2 and B1, B2 shown in FIG. 3 as examples. The separation between the different wavelengths is preferably not smaller than the width of the spectrum of one laser and not smaller than 0.5 nm in case of a very narrow spectral width per laser. Wavelength differences can be between 0.5 to 75 nm. The short and long wavelength bands may overlap and the present invention would still work albeit possibly not as well.

The light source apparatus 12 can also include an integrator 30, in this case one per primary colour RGB, the integrator being located between the light sources 21, 22, 23 . . . and the light modulator 14 or modulators 14R (for red), 14G (for green) and 14B for blue.

FIG. 3 shows an example where each primary color, red (R), green (G) and blue (B) in this example, contains two wavelengths: B1 and B2 for the blue primary, G1 and G2 for the green primary, R1 and R2 for the red primary. As seen on FIG. 3, B1, G1 and R1 are the "short" wavelengths of the blue, green and red primary respectively while B2, G2 and R2 are the "long" wavelengths of the blue, green and red primary respectively. There can be more wavelengths or wavelength ranges such as B1, G1 and R1, B2, G2 and R2.

The short and long wavelength of each primary colour, can be isolated by the use of color filters as is the case for 3D cinema as described in e.g. U.S. Pat. No. 7,832,869B2 "Method and device for performing stereoscopic image display based on color selective filters" which is incorporated herein in its entirety by reference.

A first primary colour filter can be for placing in front of one eye e.g. the left eye and this first filter, for example lets the short wavelength through and blocks the corresponding long wavelength for each primary color. For example an interference filter may be wavelength specific enough. A second filter can be for placing in front of the right eye and lets the long wavelength through and blocks the corresponding short wavelength for each primary color. For example an interference filter may be wavelength specific enough. For example, in a 3 DMD chips, single projector setting, a stereoscopic effect can be created by projecting alternatively images with the R1 G1 B1 set of primary colors which will be visible to the left eye only and images with the R2 G2 B2 set of primary colors which will be visible to the right eye only. The separation of images is obtained by use of the first and second filters described above which may be located in glasses. Images for the right and left eye will be projected sequentially at a frequency of e.g. 30 or 60 Hz. Images can also be projected simultaneously by two projectors (a first projector will project the R1 G1 B1 images and a second projector will project the R2 G2 B2 projector).

Figure 4:
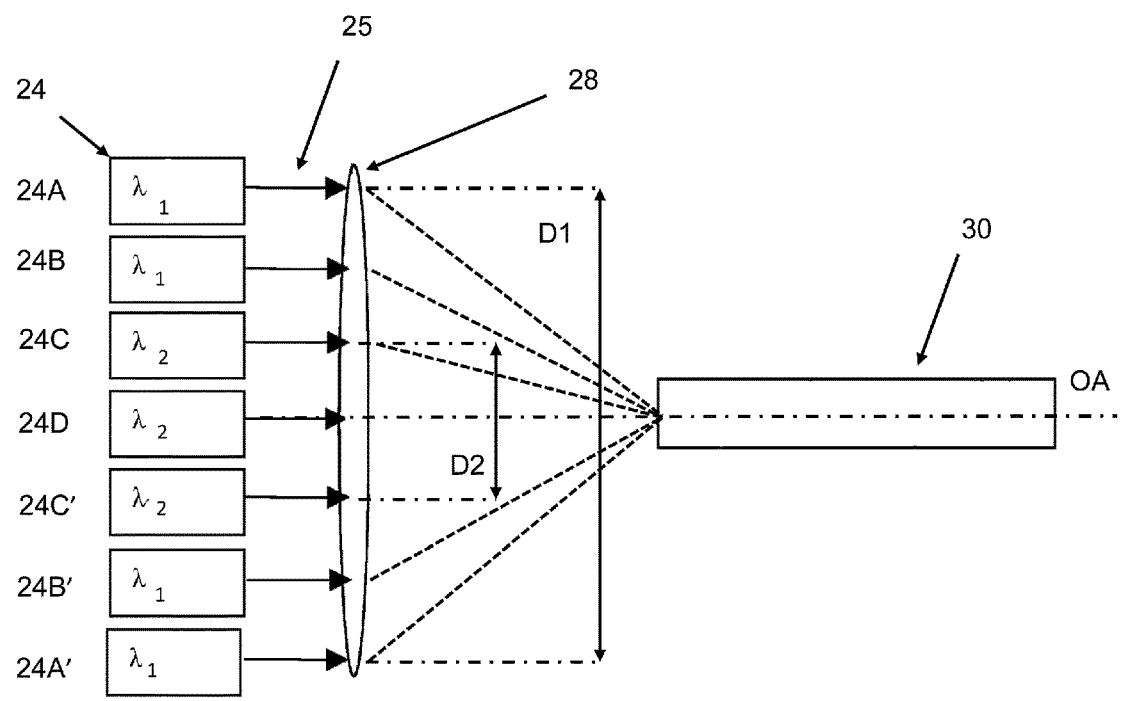
FIG. 4 shows a light source apparatus comprising a combination of an array of light source modules of the same primary colour with a number of different wavelengths according to an embodiment of the invention.

Each wavelength B1, G1 and R1, B2, G2 and R2 has a certain spectral distribution or width around a central wavelength as shown in FIG. 3. Each light source 21, 22, 23 can comprise a plurality of laser packages. The packages can be arranged so that many light sources such as lasers are distributed in an array as shown in FIG. 4. The light sources 24 are offset from each other in one direction in a line array or offset in two orthogonal directions in any other form or distribution in a 2D array such as a pseudorandom distribution. The array may have light sources spaced along orthogonal directions such as in columns and rows in a Cartesian co-ordinate system or can be spaced around circles of different diameters in polar co-ordinates, for example. Each package can emit light at one of the wavelengths, e.g. B1, G1 or R1, B2, G2 or R2 (e.g. $\lambda 1$ or $\lambda 2$ as shown in FIG. 4). Each package can emit multiple beams at the same wavelength, to increase light intensity. To further increase light intensity, multiple packages of the same wavelength can be added. In an, some or all embodiments of the present invention, within the wavelength band B1, G1 or R1, B2, G2 or R2 (e.g. $\lambda 1$ or $\lambda 2$ as shown in FIG. 4) one can have even more separated, i.e. spaced wavelengths, for instance to mitigate speckle by wavelength diversity or to get a correct color point, . . . . An example is, for example for a projector with light sources, an integrator and a light modulator, and a projection lens:

Red: five lasers from 635 nm to 637 nm, e.g. shifted in wavelength by modifying the temperature of the junction. These red wavelengths lie in the range 600-670 nm and 625-650 nm.

Green: 529.75 nm, 530.70 nm, 531.75 nm, 532.50 nm, 533.75 nm, 534.60 nm. These green wavelengths lie in the range 520-570 nm.

Blue: 464.20 nm, 456.25 nm, 466.20 nm, 467.20 nm. These blue wavelengths lie in the range 450 to 500 nm.

US 20140028985 A1 is incorporated herein in its entirety and in particular the examples mentioned therein e.g. as indicated above, are incorporated herein by reference.

Embodiments of the present invention rely on a contrast ratio of a projector having light sources, an integrator and a light modulator, the light sources being selected so that: For example, for red: the shorter the wavelength the higher the contrast at least for certain sets of wavelengths, and/or for blue and green: the longer the wavelength the higher the contrast at least for certain sets of wavelengths.

There can be, for example a plateau in at least a part of the yellow or orange part of the spectrum.

The wavelength dependency of the contrast ratio of projected images was evaluated with a projector from Barco NV with reference number DP4K-60L the specifications of which are given in table 3.

The contrast ratio was measured for six distinct wavelength bands centered on 445, 465, 532, 552, 630 and 650 nm respectively. These wavelengths are the wavelengths used in the DP4K-60L. The 6 laser wavelengths ranges are distributed per 2 in 3 color primary channels (e.g. R, G, B).

The contrast ratio was measured for each of the six wavelengths taken separately. For instance, the procedure to measure the sequential contrast ratio of the "long" red wavelengths was applied with test patterns projected with the "long" red wavelengths only, the other wavelengths being "shut-off".

Table 1 shows the results of the measurements for a DP4K-60L projector. In each case a single primary colour was projected, so that R short means that only the short red wavelengths were projected.

TABLE 1

| Wavelength band | Contrast ratio |
|---|---|
| R short | 2585 |
| R long | 2017 |
| G short | 2209 |

TABLE 1-continued

| Wavelength band | Contrast ratio |
| --- | --- |
| G long | 3071 |
| B short | NA |
| B long | 1763 |
| R 6P | 2146 |
| G 6P | 2404 |
| B 6P | 1583 |
| W 6P | 2232 |

For the short blue wavelength, accurate measurements of the contrast ratio were very difficult. It was nevertheless established that the contrast ratio with the short blue wavelength was lower than with the long blue wavelength. Indeed measurements of the average contrast ratio; i.e. the contrast ratio measured when both short and long blue wavelengths were used; were lower than the contrast ratio measured for the long blue wavelength only.

In this experimentally determined example, the short blue, short green and long red wavelengths clearly result in a lower contrast ratio than respectively the long blue, long green and short red wavelengths.

Additional measurements were made for different short and long wavelengths of green. The results are given in FIG. 15.

Figure 15:
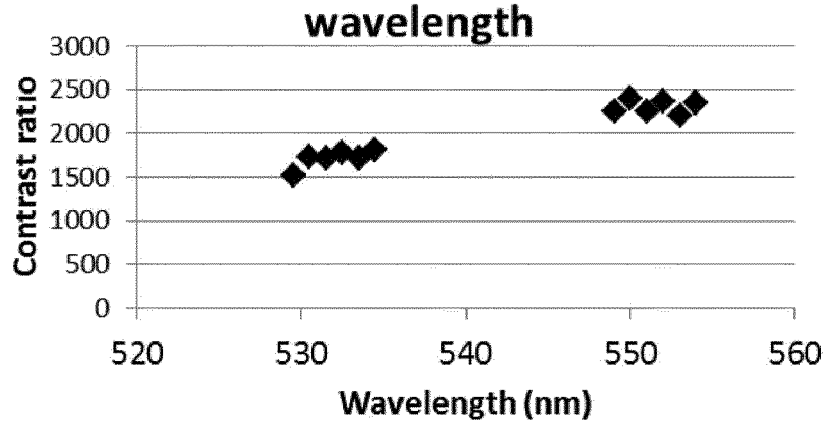
FIG. 15 illustrates an experimentally determined example of an embodiment of the present invention, with the short blue, short green and long red wavelengths resulting in a lower contrast ratio than respectively the long blue, long green and short red wavelengths.

These measurements indicate that, at least for the green primary, the contrast ratio varies as in function of the wavelength as would be expected from the results of FIG. 15.

With reference to a first embodiment of the invention an example of a light source apparatus will be described with reference to FIG. 4, e.g. which can be used in a projector with light sources, an integrator, a light modulator and a projection lens. Light sources 24 (24A, 24B . . . ) direct light beams 25, e.g. through combination optics 28 (e.g. a combination lens) to an integrator 30. Once light enters an integrating element of an integrator 30 such as a rod or pipe, it remains within the bounds of the integrator, e.g. rod or pipe due to reflection off the longitudinal walls of the integrator, e.g. rod or pipe. The different wavelengths B1, (e.g. λ1 or λ2 as shown in FIG. 4), are different wavelengths for the same primary color.

Different primary colours can be combined using dichroic mirrors, for example, before projection.

Referring to FIG. 4, at least two wavelengths λ1 and λ2 are output by a or one light source 24. The different wavelengths λ1 and λ2; are delivered from different laser packages. For example, each package can include an array of emitters, but those emitters will substantially deliver laser light at the same wavelength. Beam combination optics 28 (e.g. lens) brings the bundles of light together as closely as possible. If different microchips are used in the same package different wavelengths can be emitted out of a single package.

The f number (f/#) will be lower for light beams emitted by the light source(s) at the periphery of the array (i.e. for the ray of light with a wavelength λ1 in the example of FIG. 4 and an effective diameter such as D1) and will be higher for the light beams emitted by light sources (i.e. for the rays of light with a wavelength λ2 in the example of FIG. 4) closer to the center of the array. As the angle of incidence intended onto the integrator 30 increases with increasing distance away from the optical axis the overall f/# of the source will also decrease when adding laser sources further away from the optical axis.

When the array comprises two or more arrays, where the first one has light sources nearer to the center of the array and the second one has light sources more towards or at the edges of the array the f/# of these arrays (dimensions for use in calculating f/# indicated by D1, D2), will differ with the first array having the larger f/#.

For the light sources 24 (R or G or B) if the wavelength λ1 of the light sources at the periphery of the array corresponds to the wavelength associated to a contrast ratio lower than the contrast ratio associated with the wavelength λ2 of the light sources closer to the center of the array, the contrast ratio is improved. However, the longer wavelengths are not necessarily giving the higher contrast. It can depend on the wavelengths chosen. Embodiments of the present invention place the wavelengths providing the highest or higher contrast at a position where they generate the higher or highest f/# value and the wavelengths providing the lowest contrast at a position where they generate the lowest or lower f/# values.

For example, for the red primary, the laser packages emitting the long wavelength are preferably positioned at the periphery of the array of laser packages 24A, 24B, . . . 24A'. In other words, for the red primary, λ1 corresponds to the long wavelength and λ2 corresponds to the short wavelength. Preferably, the pixel size should be allowed for.

For the blue or green primary, the laser packages emitting the short wavelength are preferably positioned at the periphery of the array of laser packages 24A, 24B, . . . 24A'. In other words, for the blue or green primary, λ1 corresponds to the short wavelength and λ2 corresponds to the long wavelength.

More generally, for each of the primary color used, if the wavelength λ1 of the light sources at the periphery of the array is associated to the lower contrast ratio and the wavelength λ2 of the light sources closer to the center of the array is associated with the higher contrast ratio, the contrast ratio is improved. It is not necessarily the longer wavelengths that give the higher contrast. It depends on the wavelengths chosen.

Indeed:

The contrast improves with increasing f/#

The contrast is lower for the wavelength λ1 and hence the aperture D is increased (D1) and the f-number is made smaller so that the wavelength λ1 associated to the lower contrast ratio has less effect on contrast, whereas The aperture D is reduced (D2), hence the f-number is made larger by selecting wavelength λ2 which is associated to the higher contrast ratio towards or at the centre of the array The contrast is thus improved for the wavelength λ2 while it is unchanged or substantially unchanged for the wavelength λ1.

The overall contrast is thus improved in 2D images (where both short and long wavelength are seen at the same time by both eyes)

The contrast of images seen by a single eye (the one seeing the short wavelength) in 3D projection is improved as well.

This embodiment particularly improves the contrast in dark images, which is often a request or an additional desired effect in projection systems, e.g. where the lasers generating a lower contrast can be switched off.

For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

In another embodiment according to the present invention, the placement of the wavelength, for generating other visual effects on contrast ratio can be made. For the light sources 24 (R or G or B) if the wavelength λ1 of the light sources at the periphery of the array corresponds to the wavelength associated to a contrast ratio lower than the contrast ratio associated with the wavelength λ2 of the light sources closer to the center of the array, the contrast ratio is more evenly distributed among the primary colours thus making a more balanced image. Embodiments of the present invention place the wavelengths providing the lowest or lower contrast at a position where they generate the higher or highest f/# value and the wavelengths providing the higher or highest contrast at a position where they generate the lowest or lower f/# values.

For example, for the red primary, the laser packages emitting the long wavelength are preferably positioned at the center of the array of laser packages 24A, 24B, . . . 24A'. In other words, for the red primary, λ1 corresponds to the short wavelength and λ2 corresponds to the long wavelength.

For the blue or green primary, the laser packages emitting the long wavelength are preferably positioned at the periphery of the array of laser packages 24A, 24B, . . . 24A'. In other words, for the blue or green primary, λ1 corresponds to the long wavelength and λ2 corresponds to the short wavelength.

More generally, for each of the primary color used, if the wavelength λ1 of the light sources at the periphery of the array is associated to the higher contrast ratio and the wavelength λ2 of the light sources closer to the center of the array is associated with the lower contrast ratio, the contrast ratio is improved in bright images, or balanced. It is not necessarily the longer wavelengths that give the higher contrast. It depends on the wavelengths chosen.

Indeed:
The contrast improves with increasing f/#
The contrast is higher for the wavelength λ1 and hence the aperture D is increased (D1) and the f-number is made smaller so that the wavelength λ1 associated to the higher contrast ratio has a balanced effect on contrast, whereas
The aperture D is reduced (D2), hence the f-number is made larger by selecting wavelength λ2 which is associated to the lower contrast ratio towards or at the centre of the array
The contrast is thus improved for the wavelength λ2 while it is balanced for the wavelength λ1.
The overall contrast is thus balanced in 2D images (where both short and long wavelength are seen at the same time by both eyes)
The contrast of images seen by a single eye (the one seeing the short wavelength) in 3D projection is improved as well.

For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

For 3D image projection, the contrast can be made uniform for both eyes by selecting for each eye the projected wavelength to be long or short so as to equalize the effect. However, it is not essential to do so, as the next embodiments show.

Figure 5:
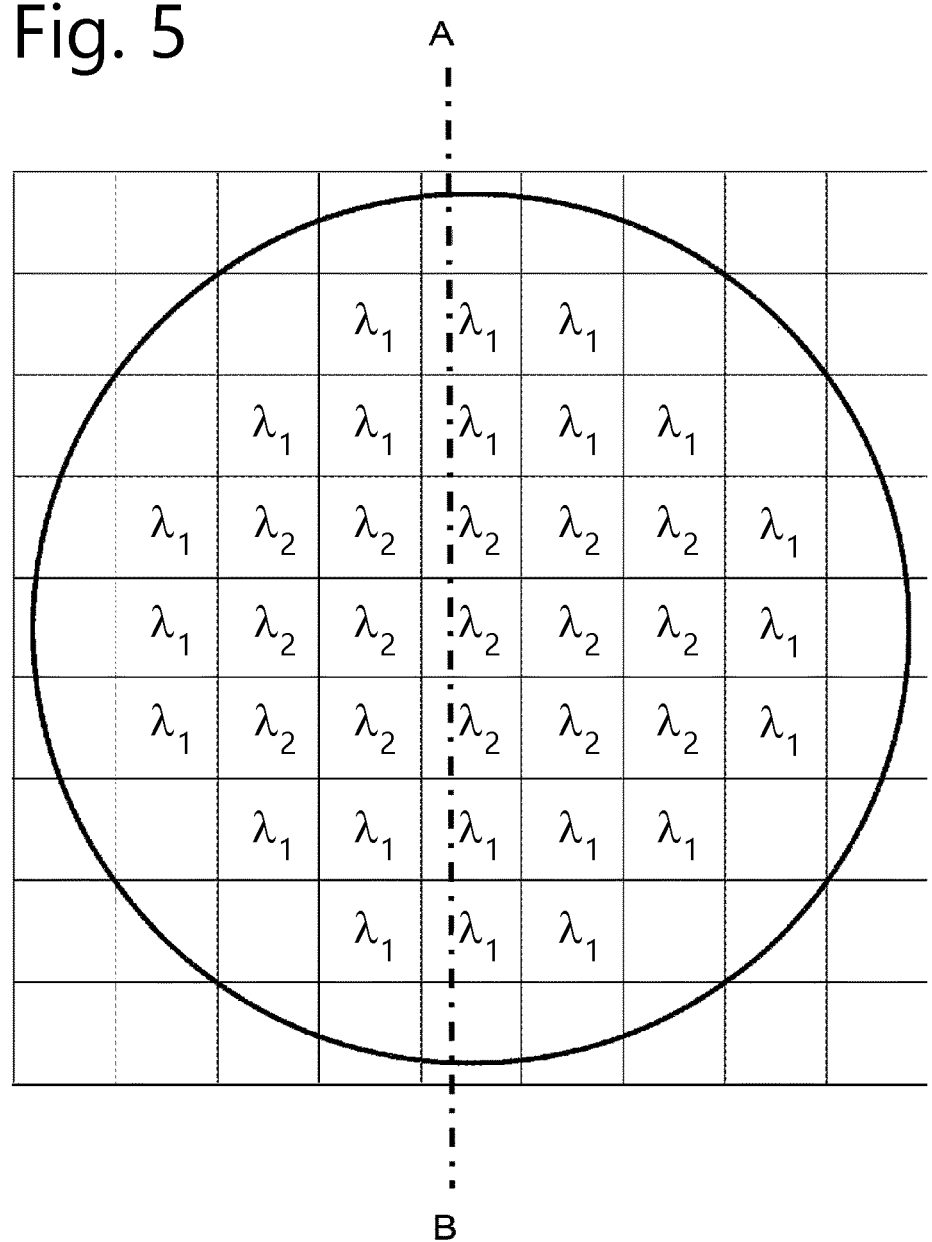
FIGS. 5 to 7 show arrangements of laser emitters in a package according to an embodiment of the present invention.

An example of distribution of laser packages is given on FIG. 5. The axis A-B corresponds to the cross section seen in FIG. 4.

A circular light array is shown in FIG. 5 with laser light sources arranged in columns and rows. With the example of the array on FIG. 5, if each laser package contains the same number of emitters and if all packages are driven identically (i.e. if they emit the same amount of light), there being more laser packages with a wavelength λ1 than laser packages with a wavelength λ2, the light with a wavelength λ1 illuminates the spatial light modulator 14 more than the light with a wavelength λ2. While increasing the amount of light with a given wavelength can be a further advantage as will be explained in another embodiment, it can be a problem for 3D projection where the images seen by the right eye and corresponding to e.g. the wavelength λ1 preferably have the same brightness as the images seen by the left eye and corresponding to e.g. the wavelength λ2. This can be solved for instance by having less emitters per package emitting light with a wavelength λ1 than there are emitters per package emitting light with a wavelength λ2 so that the total number of emitters emitting light at a wavelength λ1 is equal to the total number of emitters emitting light at a wavelength λ2.

This can also be solved by driving the laser packages differently i.e. by driving the laser packages emitting light at a wavelength λ1 at a lower optical output power than the laser packages emitting light at a wavelength λ2 so that the total power emitted at both wavelengths are equal or close enough to each other to avoid unacceptable visual artefacts. Determining whether a visual artefact is acceptable or not can be for instance determined by the SMPTE standards or any other relevant standards. Determining whether a visual artefact is acceptable or not can also be determined by the end-user of the projector.

Figure 6:
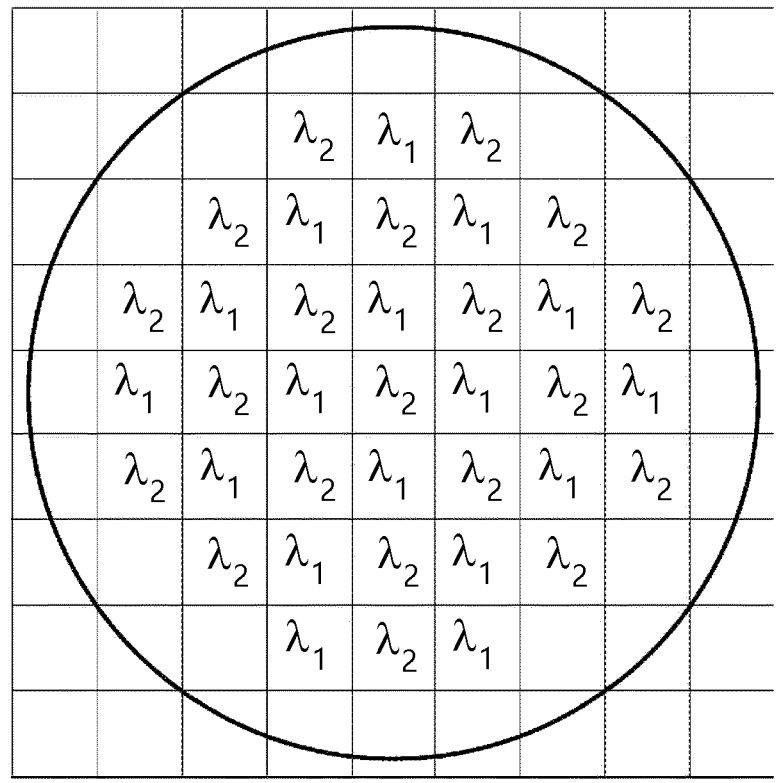
Figure 7:
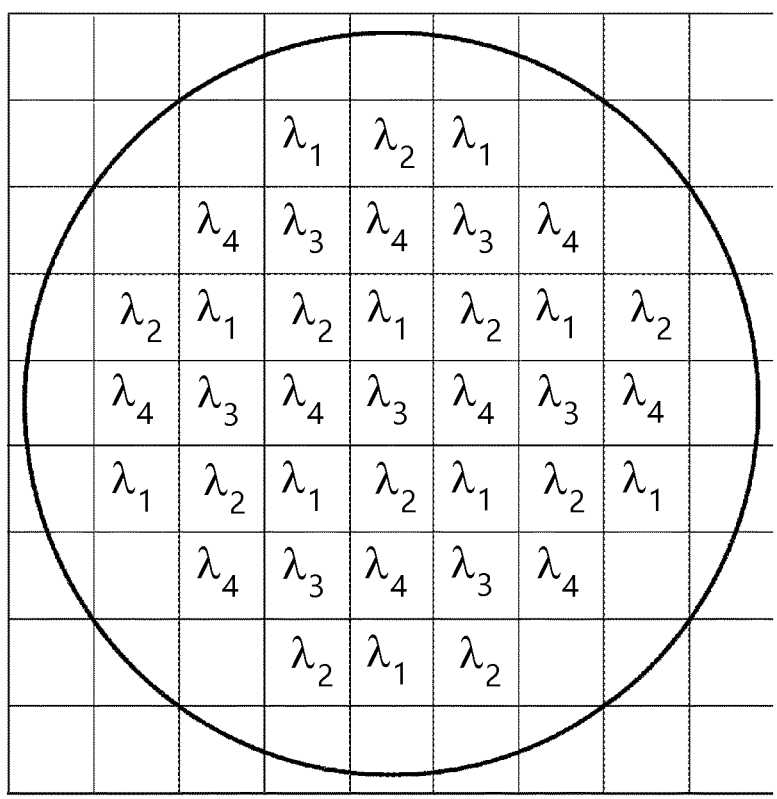

With reference to a second embodiment of the invention, the short and long wavelengths can be distributed differently in the light source as seen in FIG. 6 or FIG. 7.

In FIG. 7, the short primary contains two or more wavelengths λ1 and λ3 and the long primary contains two or more wavelength λ2 and λ4. The greater wavelength diversity may contribute to a reduction of speckle on the projection screen.

In this second exemplary embodiment, the spatial light modulator is illuminated differently for the short and long wavelength of each primary. For instance, the intensity of the blue light with the short wavelength (λ1 or λ1 and λ3) illuminating the spatial light modulator is lower than the intensity of the blue light with the long wavelengths (λ2 or λ2 and λ4) illuminating the (same) spatial light modulator. As described earlier, all other things being kept equal, the contrast of images projected on screen is higher for either the short or the long wavelength of a primary color. However, long wavelengths do not always provide a higher contrast. For green yes this may be the case, whereas for red it can be the other way around for instance. If the light sources emit more light in the wavelengths associated with a higher contrast ratio than in the wavelengths associated with the lower contrast ratio; the contrast will be higher than if long and short wavelength illuminated the spatial light modulator with the same intensity.

Controlling the intensity of the light emitted by a laser package can be done e.g. by means of pulsed width modulation or PWM, e.g. the control can be carried out by controller 18. Changing the power levels, e.g. by PWM will have an impact on dynamic (frame or scene based) contrast.

Higher contrasts can be obtained if the laser light sources are all off when the spatial light modulator such as a DMD is in the offstate. This is best performed by finding a part of the PWM cycle for which all pixels are off. In this case there is no light to be reflected towards the screen. Of course this can only be done if a certain time period of the PWM cycle is black across all mirrors of the spatial light modulator such as a DMD, or one could use a combined PWM of lasers and DMD that give a lot more bit depth and granularity. The PWM of the spatial light modulator such as a DMD can also be modified by taking into account that also the lasers can be changed in power.

In this case we assume that the minimal scene brightness is set by a DC signal, but that from frame-to-frame one can add a virtual second light source e.g. by selecting the correct lasers (or other light source/filter combinations) with which one can change the gamut and/or contrast as is required.

For example if for the baseline all 6P wavelengths are being used at 40%, but in one scene there is a need of 60% for green but it has to be more saturated towards short wavelength of green, one can add an additional 40% of short wavelength green and no extra long wavelength green to come to the 60% overall green. If both long and short green have equal power and 40% total power means both bands are running at 40%, going to 60% can then be done with 40% long and 80% short: giving an average of 60% green.

This can be done on a frame by frame basis.

An example of power dissipated by the laser packages for the short and long wavelength of each primary is given in Table 2. The results obtained by using less power for the wavelength associated with a lower contrast ratio is given in the right column of Table 2. For comparison, the power available to the same set of wavelengths in a reference projector from Barco is given in the column in the middle. In table 2, "2D mode" means that the colors are used without taking into account the constraints to project in color based stereoscopy, in particular, in 2D mode, there is no need to keep the light intensity of the short wavelength equal to the light intensity of the long wavelength for each primary.

TABLE 2

| Available power @ source | DP4K-60L in 2D mode | Example embodiment 1 - 10% higher contrast ratio |
| --- | --- | --- |
| R Short | 108 W | 108 W |
| R Long | 216 W | 150 W |
| G Short | 96 W | 48 W |
| G Long | 96 W | 96 W |
| B Short | 90 W | 70 W |
| B Long | 85 W | 85 W |

Figure 8A:
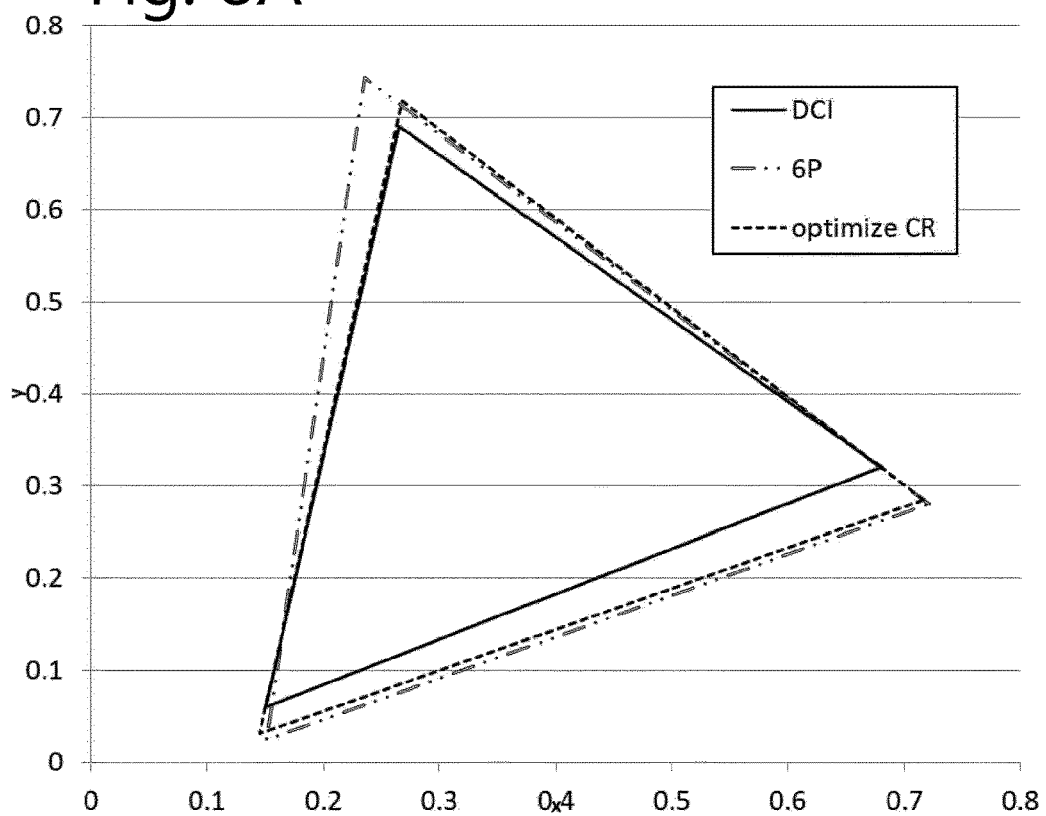
FIG. 8A shows a color gamut in an xy chromaticity diagram, whereby the color gamut obtained by modifying the ratio of power available for the short and long wavelengths of the primary colors according to embodiments of the present invention is the same or greater than what is required to comply with the DCI (Digital Cinema Initiative) requirements.

Surprisingly, modifying the ratio of long and short wavelength light sources of the primary colors still allows to keep the color gamut within the specification for digital cinema. This is illustrated in FIG. 8A that shows the color gamut in an xy chromaticity diagram.

The color gamut that can be obtained by modifying the ratio of power available for the short and long wavelengths of the primary colors is less than for 6P but is greater than what is required to comply with the DCI (Digital Cinema Initiative) requirements.

Based on table 1, the short wavelength red, long wavelength green and long wavelength blue lasers will give rise to the highest projector contrast when combined. The resulting gamut is shown as the dashed line in FIG. 8B. Although this will give rise to the highest contrast, the target gamut, DCI, shown with the continuous line is not met. However, the rec709 gamut is nearly met in this case, so even for this there can be use-case.

Figure 8B:
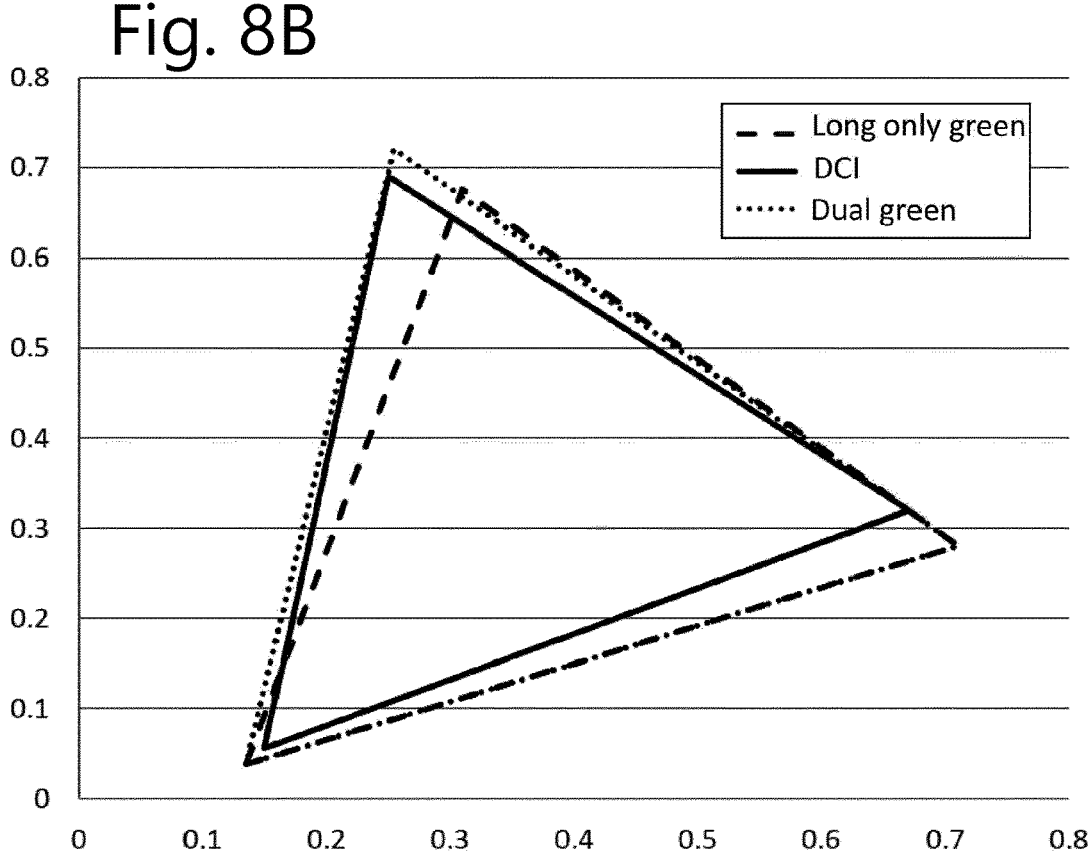
FIG. 8B shows a color gamut in an xy chromaticity diagram, whereby the color gamut obtained by selecting the appropriate short or long wavelengths of the primary which leads to the highest contrast ratio according to embodiments of the present invention is nearly DCI compliant, and the addition of the second short green leads to greater than what is required to comply with the DCI (Digital Cinema Initiative) requirements.

By just adding some short wavelength green lasers (or altering the balance between long wavelength green and short wavelength green lasers away from 0/100) one can extend the gamut of the projector to the target gamut, as illustrated by the dotted line of FIG. 8B. The higher contrast long wavelength blue and short wavelength red are not complemented by a second band in their respective primary colour in this embodiment. Thus in this embodiment only one of the primary colours, namely green, has two wavelengths or wavelength bands. Thus it is included in any of the embodiments of the present invention that only one primary colour has two wavelength bands and hence the contrast improvement will depend only on the use of these two wavelength bands. If more primary colours have two wavelength bands then the ability to influence contrast positively increases. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

In another embodiment according to the present invention, the power distribution need not be static and can vary within the values shown e.g. in Table 2 during the projection of a film. In another embodiment of the present invention, the power available to the laser arrays emitting at a given wavelength can be modulated in function of the images or scene being projected. If a scene requires a larger contrast ratio, the wavelengths associated to a lower contrast ratio (like long wavelength red, short wavelength green and/or short wavelength blue) can be switched off or emitted at a lower intensity.

The projector according to this embodiment is the same as the projector described in reference to FIG. 1. However, the controller 18 is configured to carry out further functions for dynamic contrast adaptation, as described hereunder.

For embodiments of the present invention involving dynamic alteration of contrast ratio in projected images, the projector comprises a light modulation module comprising at least one modulator, illuminated by light of at least one (preferably green), two (preferably green and red) or more primary colours or at least three primary colours, light of one, some or each of the at least one, two or more primary colours or of the at least three primary colours having at least two wavelengths or wavelength ranges. Hence, light of one or some primary colours or of each primary colour can have at least two wavelengths or wavelength ranges. The primary colours can be generated by an incoherent solid state illumination such as an LED, or a coherent light source, such as a laser. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

The projector 10 can comprise three or more light sources and light modulators such as light valves arranged in parallel—one set for each of the primary colours (e.g. red, green, blue or more), or one light modulator or set of light modulators such as light valves can be used to sequentially emit each of the primary colours, i.e. red, then green, then blue or more. To obtain special effects or to provide extended color gamut, more primary colors can be used. The number of primary colors may be three, four, five or more, for example. When a broadband light source is used, the source can be filtered spectrally whereby only a selected part of the spectrum is used although this may cause a loss of useful light. In embodiments of this invention optionally coherent light is used, and the light source 12 comprises at least one coherent light source, such as a laser light source capable of emitting high-intensity beams of one or more primary colours or a set of laser light sources which are capable of emitting high-intensity beams of one or more primary colours.

The arrangement of the light sources is an important aspect of the present embodiment and is further described below. Arrangement of the light sources in combination with filtered broadband sources can be used with any of the embodiments of the present invention. It is preferred in such a case that filtering is done differently at different position in the illumination plane. For example, a spectral filter can be used that behaves differently dependent on the position in the illumination plane. The result is similar to a 2D array of light sources. A broadband source can be combined with spatially dependent spectral filtering. Alternatively, one can combine different filtered broadband sources of course.

The projector also comprises a controller 18 which controls operation of the light source 12 and/or light modulator 14. The controller may be supplied as a separate component. Further, the controller can be configured to switch on and off any individual light source independently of the others, and/or adjust the power emitted by each light source.

Controlling the intensity of the light emitted by a laser package can be done e.g. by means of pulsed width modulation or PWM, e.g. the control can be carried out by controller 18. Alternative methods of generating light emissions at different power levels may be used.

Changing the power levels, e.g. by PWM will have an impact on dynamic (frame or scene based) contrast. The primary colours have spectra generated by light sources such as lasers or light sources formed by wavelength filtering in an illumination path from broadband sources, and wherein the primary colours in combination provide a target (e.g. DCI, REC709, . . . ) gamut, the contribution of the said narrowband sources in the said primary colours being adapted in such a way that a contrast ratio improvement is realized for projected images.

One, some or all of the embodiments of the present invention may be implemented as multi-chip and single chip implementations. In a multi-chip implementation, parts can be common and parts can be per primary colour. As described in previous embodiments of the present invention, the contrast of the projected image can be dynamically controlled by changing the power of each wavelength of the primary colors independently of one another, by changing the distribution of the light sources according to their wavelengths in an illumination aperture such that a higher or lower contrast is achieved, e.g. by selecting light sources at different positions in a 2D array of light sources. The light source apparatus 12 also include an integrator 30, in this case one per primary colour RGB, the integrator being located between the light sources 21, 22, 23 . . . and the light modulator 14 or modulators 14R (for red), 14G (for green) and 14B for blue.

The teachings related to FIG. 4 are important in this embodiment, as they dictate how to arrange light sources in the illumination plane according to and in dependence on the contrast produced by each individual light source determined by its wavelength. More generally, for each of the primary color used, if the wavelength λ1 of the light sources at the periphery of the array is associated to the lower contrast ratio and the wavelength λ2 of the light sources closer to the center of the array is associated with the higher contrast ratio, the contrast ratio is improved. It is not necessarily the longer wavelength that gives the higher contrast. It depends on the wavelengths chosen. This embodiment particularly improves the contrast in dark images, which is often a request or an additional desired effect in projection systems. An arrangement of the light sources in combination with filtered broadband sources can be used with any of the embodiments of the present invention. It is preferred in such a case that filtering is done differently at different position in the illumination plane. For example, a spectral filter can be used that behaves differently dependent on the position in the illumination plane. The result is similar to a 2D array of light sources. A broadband source can be combined with spatially dependent spectral filtering. Alternatively one can combine different filtered broadband sources of course.

The opposite rationale can be used, to achieve a different contrast effect, for each of the primary color used, if the wavelength λ1 of the light sources at the periphery of the array is associated to the higher contrast ratio and the wavelength λ2 of the light sources closer to the center of the array is associated with the lower contrast ratio, the contrast ratio is improved in bright images, or balanced. This embodiment particularly improves the contrast in bright images, which can be of significant importance is some applications.

Thus, by changing light distributions of the laser packages in a 2D array, by changing the power of each laser package, enables to switch from one extreme configuration to the other, i.e. improving contrast to balancing contrast, or improving contrast in dark images to improving contrast in bright images.

In a preferred embodiment, the light sources for the primary colours are arranged in a 2D array. Examples of arrangements of light sources in a 2D array are provided by FIG. 5 and FIG. 6 and are described in reference to FIG. 5 and FIG. 6. Advantageously, the arrangement of the light sources, or laser packages, in the 2D array is selected based on image content, or the contrast which is desired for a particular type of content to be displayed. Advantageously, to achieve dynamic contrast control, the various laser packages can be arranged randomly as a function of their wavelengths (thus, the contrast they generate) in the illumination plane, or in a checkerboard pattern, or by alternating them with respect to their distance to the optical axis. The configuration can vary as a function of the desired contrasts achievable and image content. For example, for projections wherein the only interest is to increase contrast in dark scenes, there is no use in configuring the 2D array with light sources generating high contrast at the periphery.

Thus, starting from an initial configuration of light sources in a 2D array, it is included within the scope of the present invention, that contrast can be improved by adjusting the power of each light source, to adjust the various contributions of the light sources which generate higher contrast and those which generate lower contrast by adjusting their position in the 2D array, i.e. close to the centre or the periphery, taking into account that the f number for a wavelength associated with a lower contrast of a projected image is higher than the f number for a wavelength associated with a higher contrast.

The circular array as shown in FIG. 5 and FIG. 6 can comprise additional types of sources with, for example, if each primary comprises a short and a long wavelength: λ3, λ4, λ5, λ6.

Control of the ON/OFF state or power value provided to each light source can be adjusted as a function of the instantaneous brightness of the image. The brightness of the image can be pre-calculated by software, and values of the light source powers as a function of time can be provided to the controller, to automatically adjust the power while the images are being projected. The brightness of the image can also be measured during projection of the successive images, by means of a detector, or brightness detector.

The brightness detector is e.g. an FPGA executing code with which the brightness of a scene is evaluated based on e.g. a histogram of the amplitudes of the red, blue and green component of each pixels. Alternatively, the "brightness detector" can extract metadata embedded in the input signal. The metadata can e.g. be a bit which indicates a bright scene when set (bit=1) and a dark scene when cleared (bit=0). More complex metadata can be used if e.g. more than two power settings are used.

The brightness detector or software can further calculate a plurality of local brightness values in the projected images, i.e. in the up left, up right, down left and down right quadrant of the image or more local areas are foreseeable. The brightness can be an average value, a maximum value, etc. within the entire image, or a quadrant, or any area, etc.

To achieve a dynamic contrast control, diffraction effects associated to the at least one modulator can be taken into account. Those diffraction effects are dependent for example on the dimensions of the pixels or of the pixel pitch of the light modulator, the wavelengths of the light sources, the orientation of each light modulators, or tilt angle of the different imagers or illumination angle of light onto the modulator.

All those degrees of freedom to modify the contrast of projected images can be taken into account in the dynamic control of the contrast and to dynamically change the contrast and/or brightness of projected images based on the frame or scene content.

For example, based on image content, various strategies can be followed.

Going from bright images to dark images, one can increase only the high contrast ratio wavelengths, located close to the optical axis. One can also simultaneously decrease the low contrast ratio wavelengths, located at the periphery of the 2D array of light sources.

Going from dark images to bright images, one can increase the low contrast ratio wavelengths located close to the optical axis and simultaneously increase the high contrast ratio wavelengths located at the periphery of the 2D array of the light sources.

Thus a method according to an embodiment of the present invention to dynamically adapt contrast in images comprises the steps of:
  Selecting laser sources, such that they provide one, two or more primary colours, light of one, some or each primary colour having at least two wavelengths or wavelength ranges,
  Determining a 2D configuration of the various laser sources according to their wavelengths and according to the higher or lower contrast which is associated to each wavelength, and further according to if the contrast is to be increased or balanced across the projected images,
  Pre-calibrating the various lasers of the configuration as a function of power and measured contrast, the method further comprises the step of, for each projected image, measuring the brightness of the projected images, wherein the brightness can be calculated with a brightness detector or can be provided as an input to the laser drivers, or to the controller,
  the method further comprises the step of calculating the power for each laser source as a function of the measured brightness and pre-calibration values,
  Driving each laser source with the calculated optical power.

The step of measuring the brightness of the projected images and of calculating the power of each laser can be performed during projection or can be pre-calculated by software based on the image content of the images to be projected.

In an aspect the present invention provides a method to dynamically adapt contrast in images projected by a projector having a 2D configuration of the various laser sources, the various laser sources being pre-calibrated as a function of power and measured contrast of images projected with the sources,
the method comprising the steps of:
selecting laser sources from the 2D configuration of the various laser sources, such that they provide one (preferably green), two (preferably green and red) or more primary colours, light of one, some or each of the at least one, two or more primary colours having at least two wavelengths or wavelength ranges; and
the optical power emitted at a wavelength associated with a lower contrast of a projected image is lowered when a contrast ratio of an image being projected is to be increased or dependent upon the image content. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

In another aspect the present invention provides a method to dynamically adapt contrast in images projected by a projector having a 2D configuration of the various laser sources, the various laser sources being pre-calibrated as a function of power and measured contrast of images projected with the sources, the method comprising the steps of:
selecting laser sources from the 2D configuration of the various laser sources, such that they provide one (preferably green), two (preferably green and red) or more primary colours, light of one, two or each of the at least one, two or more primary colours having at least two wavelengths or wavelength ranges; and
wherein at least one light source or at least two light sources for a primary colour is a primary colour generating a higher contrast ratio, the at least one light source or at least two light sources being selected that is/are towards or at the centre of the 2D array, or dependent upon the image content. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

Figure 9A:
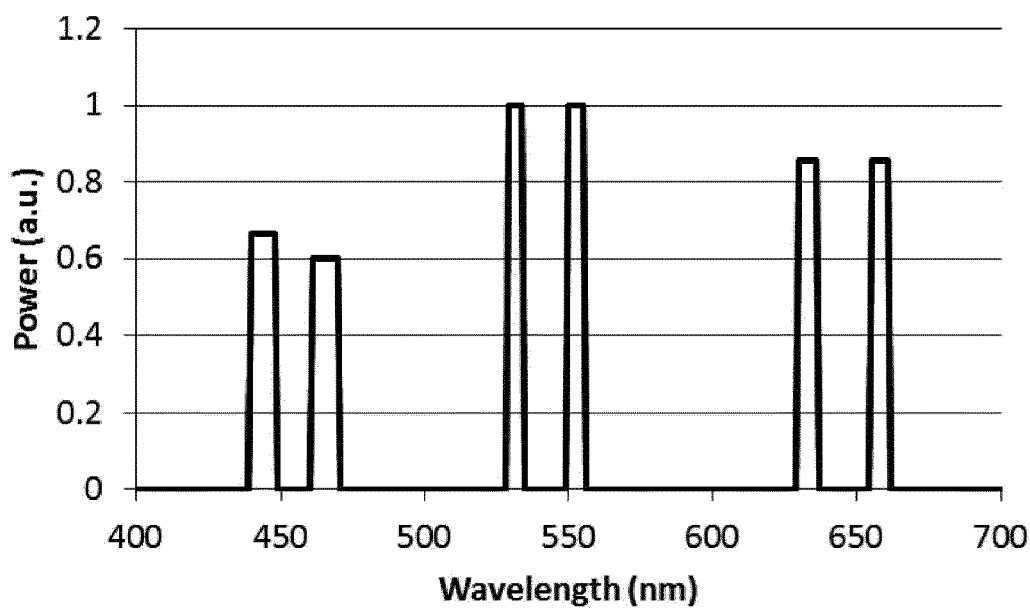
FIG. 9A shows the full spectrum with the power made available to the different wavelengths in an existing 6P projector according to an embodiment of the present invention.
Figure 9B:
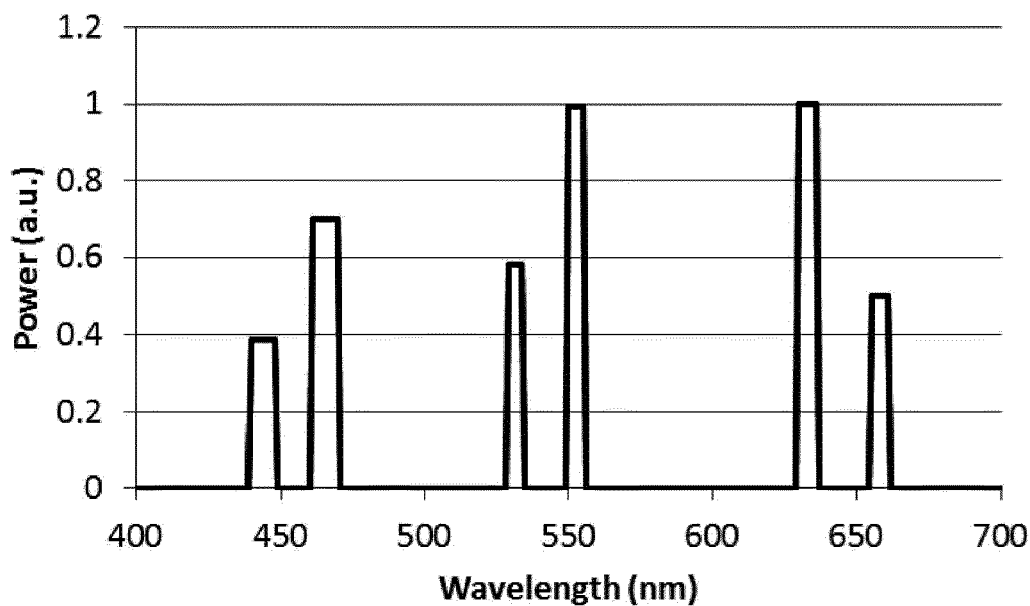
FIG. 9B shows a contrast optimized spectrum where the power made available to some of the wavelengths has been decreased according to an embodiment of the present invention.

By shutting off or lowering the contribution of certain wavelengths, the amount of de-speckling will normally decrease, but in darker scenes the effect of less wavelength diversity will be less noticeable from a speckle perception threshold point of view, whereas in brighter scenes, where contrast might be of less importance, the additional despeckling by employing a broader wavelength range is beneficial. An example of what can be done in a laser 6P projector is illustrated on FIGS. 9A and 9B. FIG. 9A shows the full spectrum with the power made available to the different wavelengths in an existing 6P projector. FIG. 9B shows a contrast optimized spectrum where the power made available to some of the wavelengths has been decreased. A comparison of FIGS. 9A and B shows that the lower wavelength ranges for green and blue primaries have been reduced whereas the higher wavelength range for red has been reduced.

This shows that the optimization may lead to power being boosted or increased for some of the wavelengths. Alternatively the power made available for some of the wavelengths can be increased while the power made available to other wavelengths is decreased. The power variation for some or all of the wavelengths can be done in function of the requirements of a particular scene being projected (like increasing the contrast of the images being projected and/or modifying the color gamut).

Figure 10:
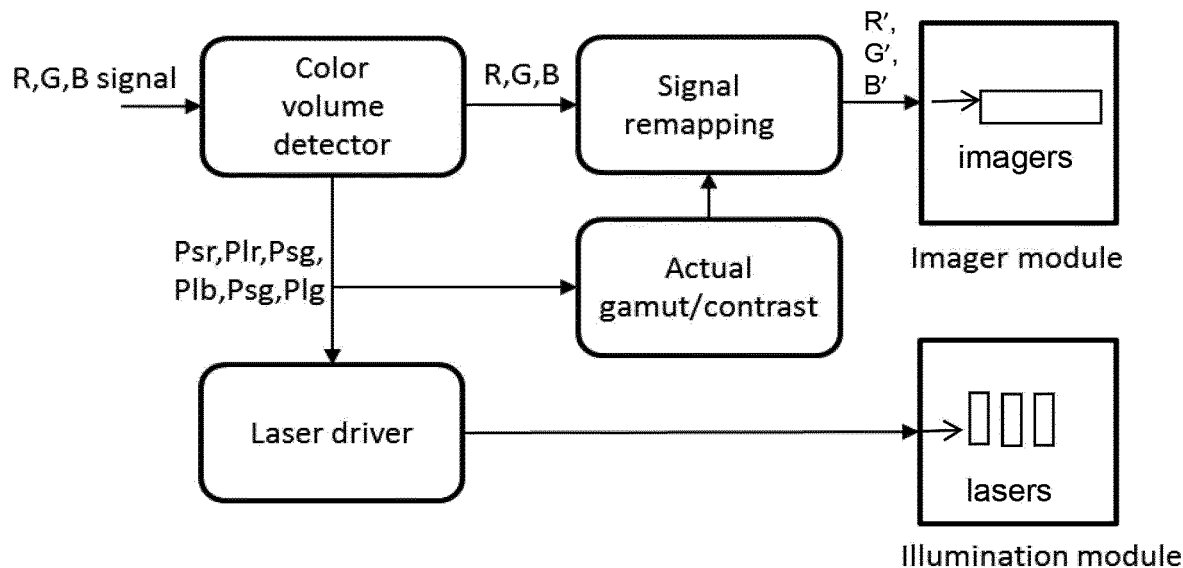
FIG. 10 illustrates a signal processing chain for a projector with 3 primaries, each primary color having a short wavelength component and a long wavelength component according to an embodiment of the present invention.

FIG. 10 illustrates a signal processing chain for a projector with 3 primaries, one, two or each primary color having a short wavelength component and a long wavelength component.

The primaries and wavelength are chosen to be compatible with the requirement of a DCI compliant "6P" projector (the triangle represented with a continuous line on FIG. 8A or 8B) but this is not limiting on the invention.

For bright scenes (i.e. scenes for which images are bright) projected in 2D, the power settings for the different wavelengths can remain as e.g. given in Table 2 for a DP4K-60L used in 2D mode.

For Dark scene, the power available at the source can be modified as indicated in the rightmost column of table 2.

More than two sets of power settings can be used. A set of power settings is the set of power available at the source for each of the lasers light sources. In table 2, a first power setting is given in the middle column and a second power setting is given in the rightmost column.

Changing the power settings affects the color gamut (as illustrated on FIG. 8A). The DCI compliant digital data encoding a movie by giving the RGB signals with which to drive the light modulators such as light valves. If the color gamut changes, the RGB signal are not correct anymore, in other words, the colors being projected on screen will not be the colors that were expected.

To compensate the change in color gamut, the RGB signals are re-calculated to produce R'G'B' signals with which the color projected on screen will correspond to the colors that were expected.

On FIG. 10, the input signal RGB is evaluated in a first step by a "brightness detector" to determine the brightness of successive images. For bright images, the contrast does not necessarily need to be improved. The "brightness detector" sends the set of power settings used for bright scenes to the laser driver which drives the light sources accordingly.

The set of power settings for the lasers emitting the different wavelengths R short, R long, Green short, Green long, Blue short and Blue long is as e.g. indicated in the middle column of Table 2. The brightness detector is e.g. an FPGA executing code with which the brightness of a scene is evaluated based on e.g. a histogram of the amplitudes of the red, blue and green component of each pixels. Alternatively, the "brightness detector" can extract metadata embedded in the input signal. The metadata can e.g. be a bit which indicates a bright scene when set (bit=1) and a dark scene when cleared (bit=0). More complex metadata can be used if e.g. more than two power settings are used.

For darker scenes, the contrast may benefit from a contrast increase. The "brightness detector" sends the set of power settings that will improved the contrast to the laser driver which drive the light sources accordingly. The set of power settings for darker scene is e.g. as indicated in the rightmost column of Table 2.

When the power setting is modified and the color gamut becomes different from the DCI color gamut, the actual color gamut being used triggers a remapping of the RGB signal into an R'G'B' signal that will. The signal triggering the remapping of the RGB input signal can be provided by the "brightness detector".

The remapping can be done e.g. based on a look-up table. In the example discussed here where only two sets of power settings are used; and hence a single look-up table per color is necessary. The look-up table stores for each color and each possible pixel amplitude, a value that can be used for determining the actual driving signal that must be sent to the light modulator such as a light valve for that pixel and that color. For example, this stored value may be such that it can be used as is to be sent to the light modulator such as light valve for that pixel and that color.

Figure 11:
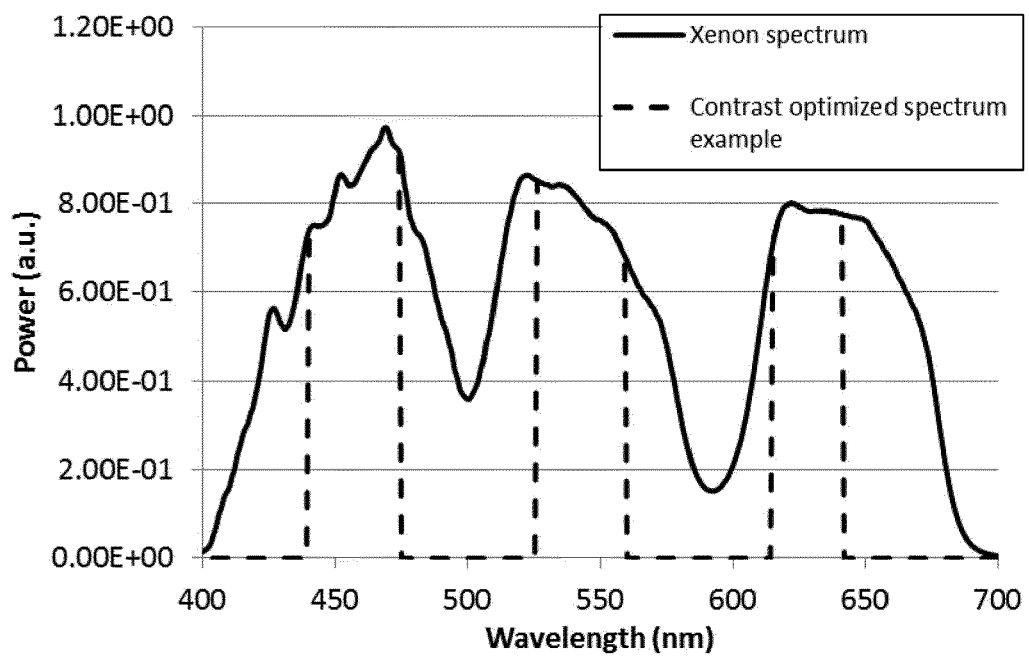
FIG. 11 illustrates the spectra of the possible filtering on a Xenon lamp based projector.
Figure 12:
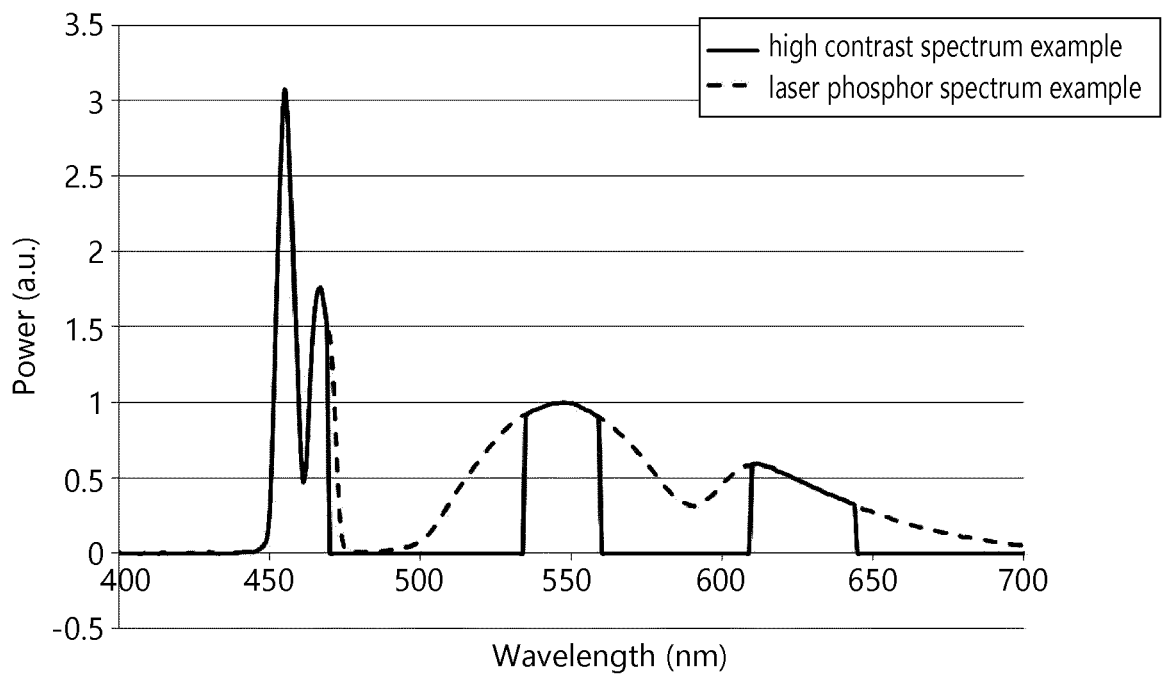
FIG. 12 gives an example for a laser phosphor source.

Some of the embodiments described above with lasers (be it direct coupled or fiber coupled) can also be implemented with broadband sources like e.g. such as laser-phosphor, xenon lamps, LEDs. In that case, filters are used to isolate wavelengths ranges. For instance an optical filter may be so arranged that it can be slid in so that it blocks (e.g. part of) the lower contrast wavelength regions. Alternatively tunable optical filters can be used to create the same result. An example of the possible filtering on a Xenon lamp based projector is shown on FIG. 11 and an example for a laser phosphor source is given on FIG. 12.

In "White paper on the Advances in Contrast Enhancement for DLP Projection" D. Scott Dewald and his co-authors remark that in tests carried out with several DLP projection system using UHP lamps in parabolic reflectors, there is a significant increase in contrast with a small decrease in brightness as the illumination angle [of the DMD] is increased 2-3 degrees. This effect was observed with both 10 degree and 12 degree DMD's."

The inventor of the present invention evaluated the contrast ratio for different wavelengths in function of the wavelength and the incidence angle on a DMD for different sizes of the micro-mirrors with coherent light sources instead of incoherent light sources. These results are seen on FIG. 13 (contrast ratio in function of the wavelength for two FTP DMDs with different pixel dimensions) and on FIG. 14 (contrast ratio in function of the angle of incidence).

Figure 13:
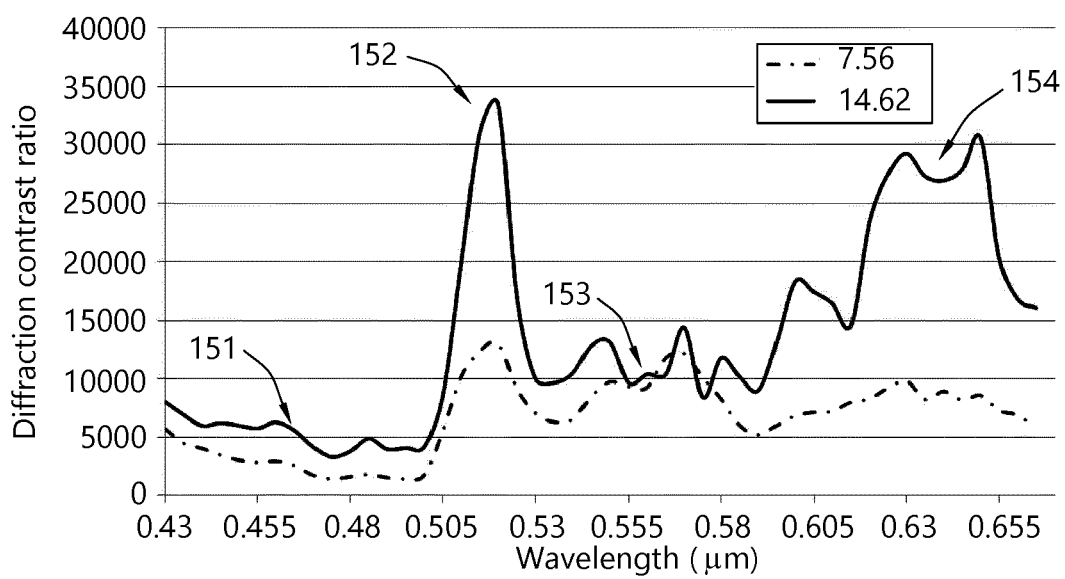
FIG. 13 shows contrast ratio in function of wavelength for two FTP DMDs with different pixel dimensions (pixel size in micrometer 14.62 and 7.56) which can be used with embodiments of the present invention.

As can be seen on FIG. 13, the contrast ratio varies in function of the dimensions of the pixels of the TFT DMD. The inventor suspected that effects associated with diffraction would influence the results and it was not expected to be able to extrapolate the conclusions of Dewald et al to coherent light sources.

Figure 14:
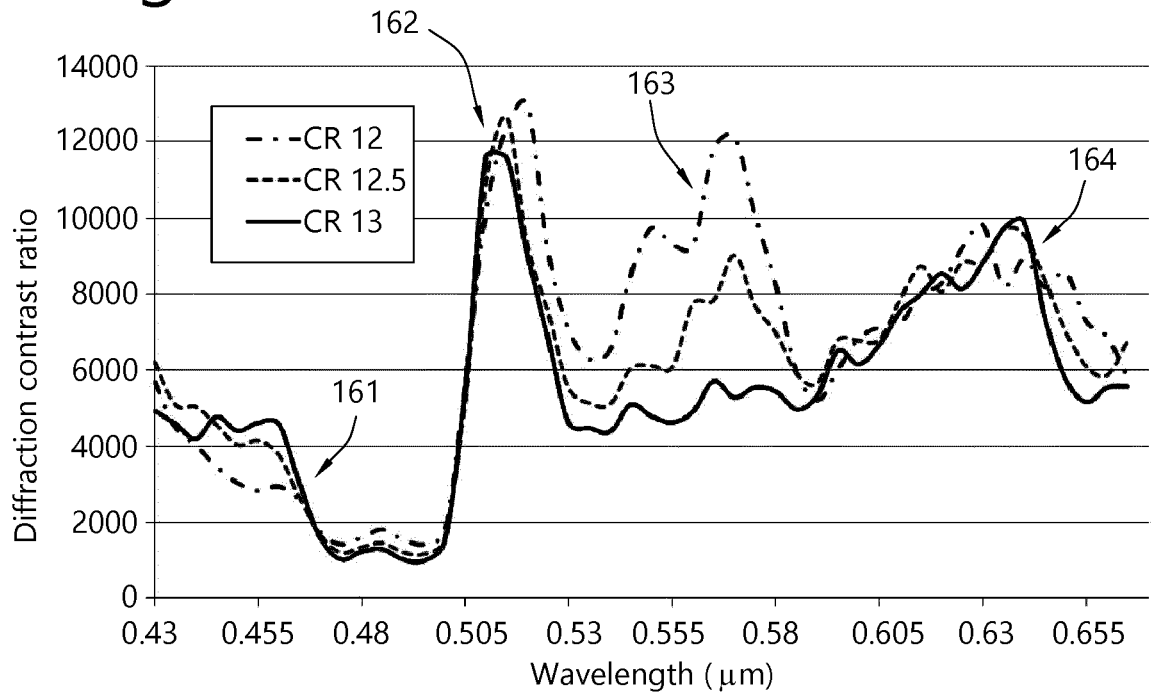
FIG. 14 shows contrast ratio in function of wavelength for a DMD in function of the angle of incidence (mirror tilt angle in degrees 12, 12.5 and 13) which can be used with embodiments of the present invention.

As can be seen on FIG. 14, the contrast ratio for some wavelengths can double when the angle of incidence on the DMD decreases by 1 degree of angle. For other wavelengths, the contrast ratio will hardly vary when the angle of incidence is changed.

FIG. 14 stresses the importance of selecting the right wavelengths to improve contrast (or merely prevent it from decreasing) when the effect of diffraction becomes more pronounced (i.e. when the dimensions of the pixels and the space between pixels decreases).

Diffraction effects can become important when the wavelength is in the range $\frac{1}{20}^{th}$ of the feature size. So in this case, for red with a wavelength of 650 nm, pixels smaller than 13-14 micron will demonstrate diffraction effects.

In accordance with an embodiment of the present invention a projector with coherent light sources, different sets of wavelengths which can be used for the primary colors can lead to optimized values to provide high contrast ratios. For some sets of wavelengths, the contrast ratio will improve by changing the angle, e.g. decreasing the angle of incidence on the DMD, for other sets the contrast ratio may remain more or less constant or even decrease as is for instance the case for wavelengths around 455 nm in FIG. 14. Also it is possible to select an angle of incidence on the DMD for one wavelength range to optimize contrast ratio for that wavelength range, and to use other methods described above to enhance contrast ratio for other wavelength ratios. Similar analysis can be used to select the best DMD mirror size.

The Y axis of FIGS. 13 and 14 is the diffraction contrast ratio, which refers to the contrast ratio contribution that is determined solely by diffraction.

Typically, contrast can be influenced by a number of other factors: unwanted reflections (stray light), scattering, ghost light.

In FIGS. 13 and 14 only the effect of diffraction on the sequential contrast is shown. So these figures do not consider contrast alterations by scattering, stray light and/or ghosting, for example.

From FIGS. 13 and 14 a design and an operation mode can be determined.

Firstly for a factor which influences contrast, the contrast ratio in dependency of wavelength is determined. The selection results can be any of:
  a) At least one of two wavelength ranges for a primary colour having a low or a lower value of contrast ratio when the wavelength is selected from a wavelength range greater than 0.05 micron and less than 0.1 micron in which the contrast ratio is low sensibly constant. Preferably, the light sources for the selected range of the at least one of two wavelength ranges are located close to the periphery of the 2D array of light sources. This is for example shown on FIG. 13 with reference number 151 wherein the contrast ratio is low for both pixel sizes, over the range of wavelengths of 0.43 to 0.5 μm, thus a range of more than 0.05 μm. The same is shown with reference number 161 on FIG. 14 for different angles of incidence, however a peak is present in this range.
  b) At least one of two wavelength ranges for a primary colour are selected which have a large or a larger value of contrast ratio, the at least one of two wavelength ranges for a primary colour is selected from within contrast ratio peak of less than 0.02 micron width in which the contrast ratio achieved is high. Preferably, the light sources for the selected range of the at least one of two wavelength ranges are located close to the centre of the 2D array of light sources. This is for example shown on FIG. 13 with reference number 152 wherein the contrast ratio is higher for the pixel size of 14.62 μm, over the range of wavelengths 0.505 to 0.52 μm, thus over a range smaller than 0.2 μm. A similar peak is present on FIG. 14, shown with reference number 162, however the peak intensity is similar for all three incidence angles.
  c) At least one of two wavelength ranges for a primary colour are selected which have a large or a larger value of contrast ratio, the at least one of two wavelength ranges for a primary colour are selected from a wavelength range greater than 0.05 micron and less than 0.1 micron. Preferably, the light sources for the selected range of the at least one of two wavelength ranges are located close to the centre of the 2D array of light sources. This is for example shown on FIG. 13 with reference number 153 wherein the contrast ratio is low and there are small differences over the range of wavelengths from 0.53 to 0.62 μm between the two pixel sizes, thus over a range larger than 0.05 μm. On the contrary, there are large differences on FIG. 14, shown with reference number 163, over the range of wavelengths of 0.54 to 0.59 μm, thus over a range larger than 0.05 μm, for the various incidence angles.
  d) At least one of two wavelength ranges for a primary colour are selected which have a low or lower value of contrast ratio, the at least one of two wavelength ranges for a primary colour wavelength are selected from a peak with wavelength range less than 0.02 micron. Preferably, the light sources for the selected range of the at least one of two wavelength ranges are located close to the periphery of the 2D array of light sources.

Finally, reference number 154 in FIG. 13 shows a large difference between the two pixel sizes over the range of wavelengths of 0.62 to 0.68 μm, which is larger than a range of 0.05 μm. On the contrary, reference number 164 in FIG. 14 shows similar values for all three incidence angles over the range of 0.59 μm to 0.66 μm, which corresponds to a range larger than 0.05 μm.

Once this analysis has been done decisions can be made as to how to create high contrast images, e.g. by
  a) Selecting a narrow band wavelength range for at least one of the wavelength ranges for a primary which creates a high contrast ratio and preferably locate the light sources for this wavelength range towards or at the centre of the 2D light source array.
  b) Where there is very little difference of contrast ratio over a large range then it can be considered whether a laser is really necessary or whether one could employ cheaper light sources that have a broader spectrum which can be filtered if necessary. Contrast can be improved by other means, such as altering power supplied to light sources and e.g. to those sources located towards or at the periphery of the light source array. Or the number of light sources for a primary can be increased.

For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

In preparation for an operational mode, the above analysis of factors affecting contrast and having difference over the visible spectrum is carried out and used to create sets of light sources of different wavelengths or wavelength ranges suitable for different situations, e.g. for very dark images, or images without or with a reduced content in one of the primaries. To achieve flexibility in selecting optimised wavelength ranges for light sources, more than two light sources may be used in a 2D array of light sources. Motorised filters may be used to move specific filters in and out of the optical path. For example light may be generated by a phosphor whose light output can be filtered by such a motorised or hand moveable insertion filter.

Methods according to the present invention can be performed by a control unit 18, either as a standalone device or embedded in a projector. The present invention can use a processing engine to carry out functions. The processing engine preferably has processing capability such as provided by one or more microprocessors, FPGA's, or a central processing unit (CPU) and/or a Graphics Processing Unit (GPU), and which is adapted to carry out the respective functions by being programmed with software, i.e. one or more computer programmes. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such a controller (18) may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions itemised below when the software is loaded onto the controller and executed on one or more processing engines such as microprocessors, ASIC's, FPGA's etc. Hence a controller (18) for use with any of the embodiments of the present invention can incorporate a computer system capable of running one or more computer applications in the form of computer software.

The methods described above can be performed by one or more computer application programs running on the computer system by being loaded into a memory and run on or in association with an operating system such as Windows™ supplied by Microsoft Corp, USA, Linux, Android or similar. The computer system can include a main memory, preferably random access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the following functions when the software is loaded onto the respective device or devices and executed on one or more processing engines such as microprocessors, ASIC's, FPGA's etc.: operating a projector having a light modulator illuminated by light of at least one, preferably green, two, preferably green and red or more primary colours, light of one, two or each primary colour having at least two wavelengths or wavelength ranges. For a single primary colour to have two wavelengths or two wavelength ranges, green is thus preferably selected e.g. in the range 520-570 nm. For two primary colours each to have two wavelengths or two wavelength ranges, green e.g. in the range 520-570 nm and red, e.g. in the range 570-700 nm, more preferably 600-670 nm, and even more preferably 625-650 nm, are most preferably selected. Blue wavelengths can lie in the range 425 to 500 nm.

The software embodied in the computer program product is adapted to carry out the following functions when the software is loaded onto the respective device or devices and executed on one or more processing engines such as microprocessors, ASIC's, FPGA's etc.:
controlling emitting light at a wavelength or wavelength range associated with a lower contrast ratio of a projected image with a first optical power that is lower than a second optical power emitted at a wavelength associated with a higher contrast of the projected image.

The software embodied in the computer program product is adapted to carry out the following functions when the software is loaded onto the respective device or devices and executed on one or more processing engines such as microprocessors, ASIC's, FPGA's etc.: controlling emitting light at a wavelength associated with a lower contrast of a projected image with a lower optical power when a contrast ratio of an image being projected is to be increased.

The software embodied in the computer program product is adapted to carry out the following functions when the software is loaded onto the respective device or devices and executed on one or more processing engines such as microprocessors, ASIC's, FPGA's etc.: Controlling the generation of light having primary colours as emitted by a coherent light source such as a laser.

The software embodied in the computer program product is adapted to carry out the following functions when the software is loaded onto the respective device or devices and executed on one or more processing engines such as microprocessors, ASIC's, FPGA's etc.:
Controlling light sources for the primary colours arranged in a 2D array, wherein at least one light source for a primary colour is a primary colour is generating a lower contrast ratio, and the at least one light source is placed at the periphery of the array.

The software embodied in the computer program product is adapted to carry out the following functions when the software is loaded onto the respective device or devices and executed on one or more processing engines such as microprocessors, ASIC's, FPGA's etc.:
controlling at least one light source for a primary colour is a primary colour generating a higher contrast ratio, the at least one light source being placed towards or at the centre of the array.

The software embodied in the computer program product is adapted to carry out the following functions when the software is loaded onto the respective device or devices and executed on one or more processing engines such as microprocessors, ASIC's, FPGA's etc.:
the primary colours having spectra generated by light sources such as lasers or light sources formed by wavelength filtering in an illumination path from broadband sources, and wherein the primary colours in combination provide a target (e.g. DCI, REC709, . . . ) gamut, adapting the contribution of the said narrowband sources in the said primary colours in such a way that a contrast ratio improvement is realized for projected images and/or each wavelength of the primary colours is controlled independently of one another to dynamically change the contrast and/or brightness of projected images based on the frame or scene content.

The software embodied in the computer program product is adapted to carry out the following functions when the software is loaded onto the respective device or devices and executed on one or more processing engines such as microprocessors, ASIC's, FPGA's etc.:

controlling a distribution of wavelengths in an illumination aperture such that a higher contrast ratio is obtained, and/or controlling how diffraction is used to increase contrast of projected images, and/or a dimension of a pixel or of a pixel pitch of the light modulator is selected to increase contrast.

The software embodied in the computer program product is adapted to carry out the following functions when the software is loaded onto the respective device or devices and executed on one or more processing engines such as microprocessors, ASIC's, FPGA's etc.: the light modulators having mirrors that tilt, and the tilt angles of the different imagers are selected such that higher contrast is obtained.

Selecting an illumination angle of onto the light modulator has a similar effect as setting the tilt angle change.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid state memory such as a USB flash memory, a ROM, etc.

TABLE 3

| | |
|---|---|
| Resolution | 4,098 × 2,160 |
| Brightness | Up to 56,000 lumens |
| Native contrast ratio | 2,800:1 (typical) |
| Prime lenses | 1.13-1.65; 1.35-1.86; 1.46-2.10; 1.65-2.60; 2.00-3.35 |
| Long-term brightness stability | Less than 20% decrease during a runtime of 30,000 hrs |
| Dimensions (W × L × H) | Projector: 744 × 1,445 × 706 mm/29.3 × 56.9 × 27.8 inches (with feet, no lens) Two chillers, each with the following dimensions: 701 × 701 × 800 mm/27.6 × 27.6 × 31.5 inches |
| Weight | Projector: 235 kg (~520 lb) Chillers: ~115 kg (~250 lb) per chiller (two chillers needed) |
| Cooling liquid hose length | 2.5-5-10 m (8.2-16.4-32.8 ft) |
| Power requirements | Projector: 200-240/346-415 V 50-60 Hz 16 A 3 W + N + PE (Y connection)/Power cord size range: 4 sq mm to 6 sq mm, 10AWG to 8AWG/Circuit breaker range: 25 A to 40 A 200-240 V 3 W + PE 28 A 50-60 Hz (Δ-connection)/Power cord size: 6 sq mm, 8AWG/Circuit breaker: 40 A Chillers: 230/400 V 3 W + N + PE 16 A, 2.5 sq mm (Y connection) or 208 V/3 W + PE (Δ-connection)/Max. 16 A per phase |
| Ambient temperature | 30° C. (86° F.) Max. (projector and chillers) |
| Ambient humidity | 75% Max. (projector and chillers) |
| Power consumption | Projector @ full laser power: 6.7 kW (2D or Polarization 3D)/3.6 kW (Barco Laser3D - 6P) Chillers @ full laser power: 3.0 kW (2D or Polarization 3D)/2.5 kW (Barco Laser3D - 6P) Projector @ half laser power: 3.6 kW (2D or Polarization 3D)/2.2 kW (Barco Laser3D - 6P) Chillers @ half laser power: 2.5 kW (2D or Polarization 3D)/2.0 kW (Barco Laser3D - 6P) |
| Media server | Barco Alchemy ICMP included in the projector: JPEG2000 2K & 4K DCI play-out High Frame Rates 3D up to 120 fps (60 fps per eye) 2x DisplayPort 1.1a 2x 3G-SDI inputs 1x HDMI 1.4a input 2D and PCM audio/4K 24 fps 16x AES/EBU audio channels (2x RJ45) |
| 3D systems | Color3D (Barco Laser3D): Native 6-primary color-3D system. Only requires color filter glasses (Dolby3D glasses cannot be reused) Active glasses systems Polarization recuperation systems |
| DCI | Projector + Barco Alchemy ICMP DCI CTP 1.2 certified |
| Certifications | CE; ETL/UL/FCC |

The invention claimed is:

1. A projector, comprising a light modulation module, comprising at least one light modulator, illuminated by light of at least one, two or more primary colours, light of one, some or each primary colour having at least two wavelengths or wavelength ranges,
wherein the optical power emitted at a wavelength or wavelength range or an f number for a wavelength or wavelength range is set to increase contrast of a projected image,
the projector further comprising light sources for the primary colours arranged in a 2D array, wherein at least one light source for a primary colour is a primary colour generating a higher contrast ratio, the at least one light sources being placed towards or at the centre of the array.

2. The projector according to claim 1, wherein for a single primary colour to have two wavelengths or two wavelength ranges, green is selected, and for two primary colours each to have two wavelengths or two wavelength ranges, green and red, are selected.

3. The projector according to claim 2, wherein green is in the range 520-570 nm and red, is in the range 570-700 nm, more preferably 600-670 nm and even more preferably 625-650 nm.

4. The projector according to claim 1, wherein at least one light source for a primary colour is a primary colour generating a lower contrast ratio, the at least one light sources are placed at the periphery of the array.

5. The projector according to claim 1, wherein diffraction is used to increase contrast of projected images.

6. The projector according to claim 1, wherein a dimension of a pixel or of a pixel pitch of the light modulator is selected to increase contrast.

7. The projector according to claim 5, wherein the at least one light modulator has mirrors that tilt, and the tilt angles of the different imagers or an illumination angle of light onto the light modulator is/are selected such that higher contrast is obtained.

8. A controller for a projector having a light modulation module comprising at least one light modulator illuminated by light of light sources emitting light of at least one, two or more primary colours, light of one, some or each primary colour having at least two wavelengths or wavelength ranges,
wherein the controller is adapted to control optical power emitted at a wavelength or wavelength range or an f number for a wavelength or wavelength range to increase contrast of a projected image,
for use with light sources for the primary colours arranged in a 2D array, wherein at least one light source for a primary colour is a primary colour generating a higher contrast ratio, the controller activating at least one light source placed towards or at the centre of the array for the primary colour generating a higher contrast ratio.

9. The controller according to claim 8, wherein for a single primary colour to have two wavelengths or two wavelength ranges, green is selected, and for two primary colours each to have two wavelengths or two wavelength ranges, green and red, are selected.

10. The controller according to claim 9, wherein green is in the range 520-570 nm and red is in the range 570-700 nm, more preferably 600-670 nm and even more preferably 625-650 nm.

11. The controller according to claim 9, wherein at least one light source for a primary colour is a primary colour generating a lower contrast ratio, and the controller activates light sources placed at the periphery of the array for the primary colour generating a lower contrast ratio.

12. The controller according to claim 8, wherein the controller is adapted to use diffraction to increase contrast of projected images.

13. A method of operating a projector having a modulation module comprising at least one light modulator, the method comprising:
illuminating with light of at least one, two or more primary colours, light of one, some or each primary colour having at least two wavelengths or wavelength ranges, controlling optical power emitted at a wavelength or wavelength range or an f number for a wavelength or wavelength range to increase contrast of a projected image,
the projector further comprising light sources for the primary colours arranged in a 2D array, wherein at least one light source for a primary colour is a primary colour generating a higher contrast ratio, the at least one light source being placed towards or at the centre of the array.

14. The method according to claim 13, wherein for a single primary colour to have two wavelengths or two wavelength ranges, green is selected, and for two primary colours each to have two wavelengths or two wavelength ranges, green and red, are selected.

15. The method according to claim 14, wherein green is in the range 520-570 nm and red is in the range 570-700 nm, more preferably 600-670 nm and even more preferably 625-650 nm.

16. The method of operating a projector according to claim 13, wherein at least one light source for a primary colour is a primary colour generating a lower contrast ratio, and the at least one light source is placed at the periphery of the array.

17. The method for operating a projector according to claim 13, wherein diffraction is used to increase contrast of projected images.

18. The method for operating projector according to claim 13, wherein a dimension of a pixel or of a pixel pitch of the at least one light modulator is selected to increase contrast.

19. The method of operating a projector according to claim 17, the at least one light modulators have mirrors that tilt, and the tilt angles of the different imagers or an illumination angle of light onto the light modulator is/are selected such that higher contrast is obtained.

20. The method of operating a projector according to claim 13, which further comprises the steps of:
selecting laser sources, such that they provide one, two or more primary colours, light of one, some or each primary colour having at least two wavelengths or wavelength ranges,
determining a 2D configuration of the various laser sources according to their wavelengths and according to the higher or lower contrast which is associated to each wavelength, and further according to if the contrast is to be increased or balanced across the projected images,
pre-calibrating the various lasers of the configuration as a function of power and measured contrast,
the method further comprises the step of, for each projected image,
measuring the brightness of the projected images, wherein the brightness can be calculated with a brightness detector or can be provided as an input to the laser drivers,
the method further comprises the step of calculating the power for each laser source as a function of the measured brightness and pre-calibration values, and
driving each laser source with the calculated optical power.

21. A non-transient signal storage means storing a computer program product comprising software, which when executed on a processing engine, executes the method of claim 13.

* * * * *